(12) United States Patent
Nozue et al.

(10) Patent No.: US 7,385,156 B2
(45) Date of Patent: Jun. 10, 2008

(54) PRESS-FIT JOINT STRUCTURE

(75) Inventors: Akira Nozue, Tokyo (JP); Osamu Kimpara, Tokyo (JP); Masayuki Mizutani, Tokyo (JP); Takuya Saito, Tokyo (JP); Kazuyoshi Harada, Miyada-mura (JP)

(73) Assignees: Ohashi Technica, Inc., Tokyo (JP); TK Co., Ltd., Nagano (JP)

( * ) Notice: Subject to any disclaimer, the term of this patent is extended or adjusted under 35 U.S.C. 154(b) by 186 days.

(21) Appl. No.: 10/506,050

(22) PCT Filed: Oct. 9, 2003

(86) PCT No.: PCT/JP03/12987

§ 371 (c)(1),
(2), (4) Date: Aug. 30, 2004

(87) PCT Pub. No.: WO2005/000516

PCT Pub. Date: Jan. 6, 2005

(65) Prior Publication Data

US 2005/0127044 A1    Jun. 16, 2005

(30) Foreign Application Priority Data

Jun. 27, 2003    (JP) .............................. 2003-184398

(51) Int. Cl.
B23K 11/00    (2006.01)
(52) U.S. Cl. ................... 219/107; 219/101; 219/104
(58) Field of Classification Search ............. 219/78.01, 219/148, 149, 59.1, 78.02, 162, 107, 104, 219/101; 285/21.3, 21.1, 21.2, 332, 423
See application file for complete search history.

(56) References Cited

U.S. PATENT DOCUMENTS 1,776,615 A * 9/1930 Boothman et al. .......... 428/609
2,202,405 A * 5/1940 Smith ......................... 219/107
2,262,705 A * 11/1941 Tuttle ........................ 148/524

(Continued)

FOREIGN PATENT DOCUMENTS

JP    2001-353628    * 12/2001

*Primary Examiner*—Jonathan Johnson
*Assistant Examiner*—Michael Aboagye
(74) *Attorney, Agent, or Firm*—Westerman, Hattori, Daniels & Adrian, LLP.

(57) ABSTRACT

A forced-insertion welded structure is provided which is formed by welding members making up a metal component and which is easy to manufacture and has low cost, a good finish precision and a high bonding strength.

The forced-insertion welded structure comprises: a first member 2 with a hole 13 which has the same geometry as a cross section of a forcibly inserted portion of a second member; and the second member 4 having a constant cross section over its length which is similar in shape to the hole 13; wherein a press-fit interference of the second member 4 relative to the hole 13 of the first member 2 is set to 0.1 mm or more; wherein the second member 4 is pushed against the hole 13 of the first member 2 under a predetermined pressure and at the same time an electric current is applied between the two members to generate electric resistance heat in faying portions of the two members to forcibly push the second member 4 into the hole 13, thereby forming a joint interface between the second member 4 and the inner wall surface of the hole 13; wherein the joint thus formed is a solid-state welded joint.

4 Claims, 16 Drawing Sheets

U.S. PATENT DOCUMENTS

| | | | | |
|---|---|---|---|---|
| 2,639,119 A | * | 5/1953 | Greenwald | 416/217 |
| 4,930,817 A | * | 6/1990 | Fuchs | 285/189 |
| 5,338,072 A | * | 8/1994 | Bitter et al. | 285/288.1 |
| 5,519,182 A | * | 5/1996 | Linzell | 219/117.1 |
| 5,742,020 A | * | 4/1998 | Adachi et al. | 219/78.01 |
| 6,131,954 A | * | 10/2000 | Campbell | 285/21.1 |
| 6,253,989 B1 | * | 7/2001 | Bennett | 228/135 |
| 6,552,292 B1 | * | 4/2003 | Nomura et al. | 219/78.02 |

* cited by examiner

Fig. 1
(a)
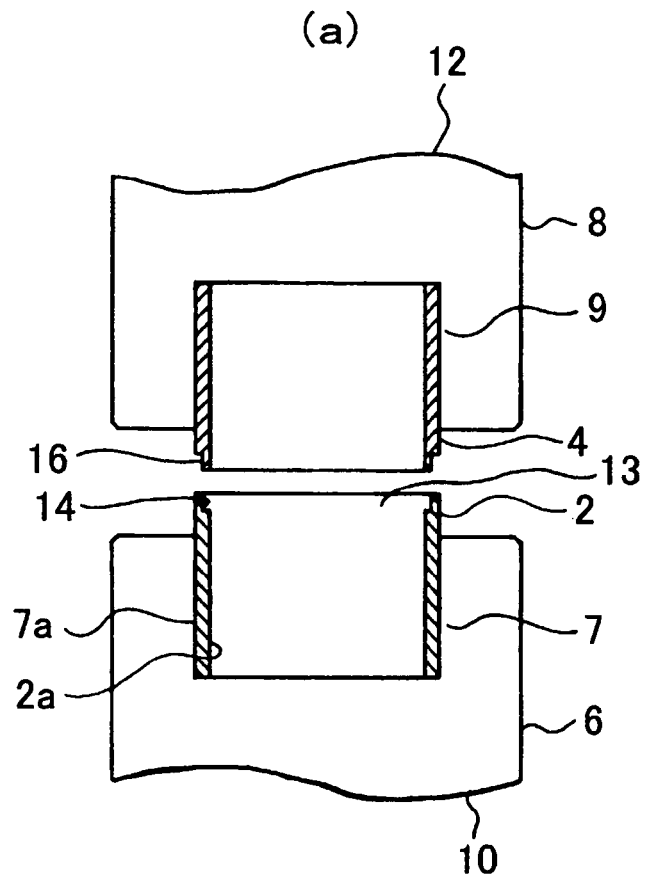
(b)
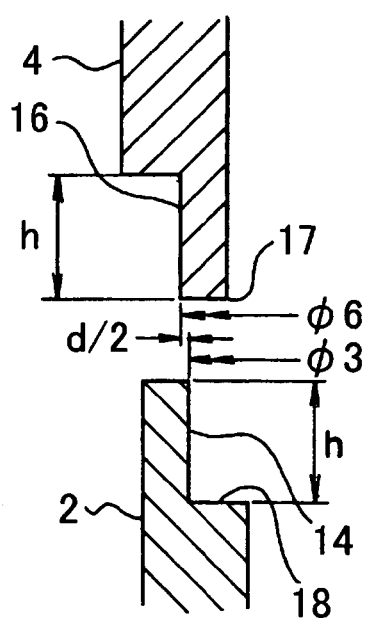
(c)
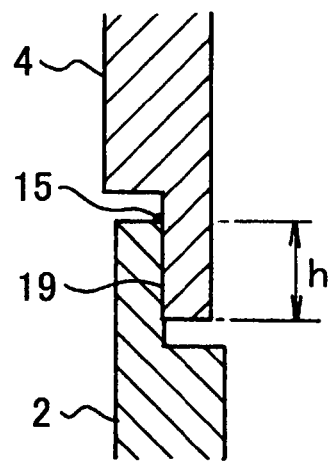

Fig. 6
(a)
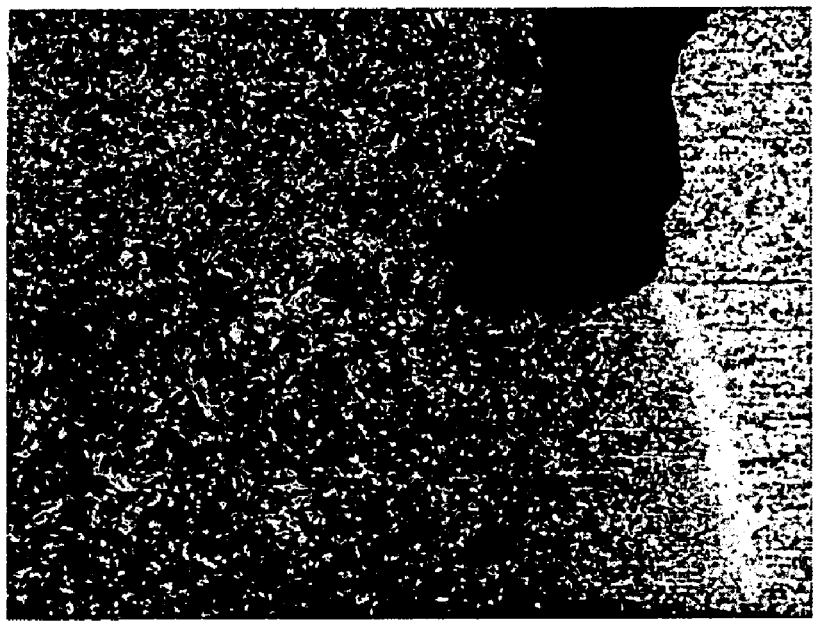
(b)
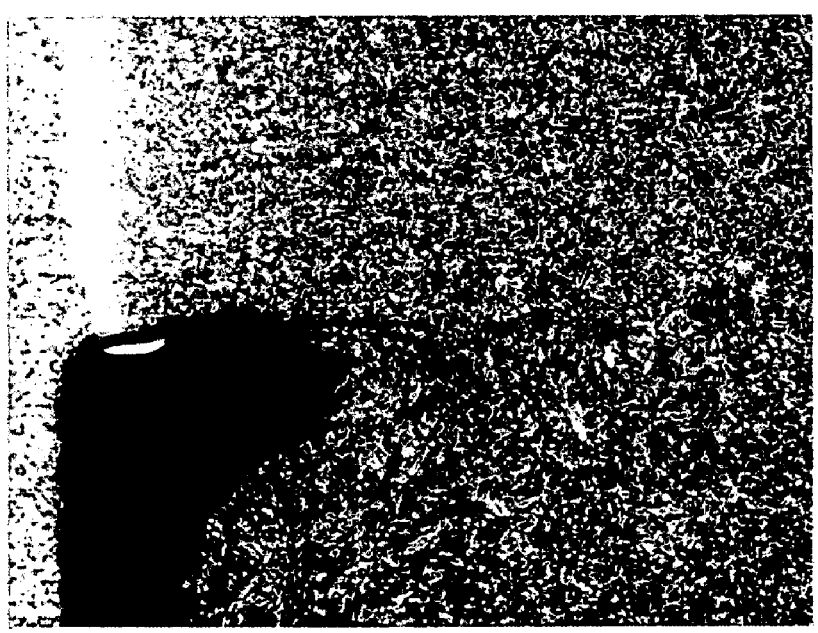

Fig. 7
(a)
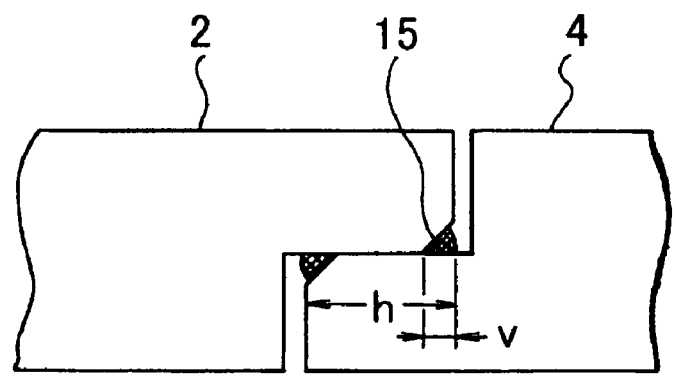
(b)
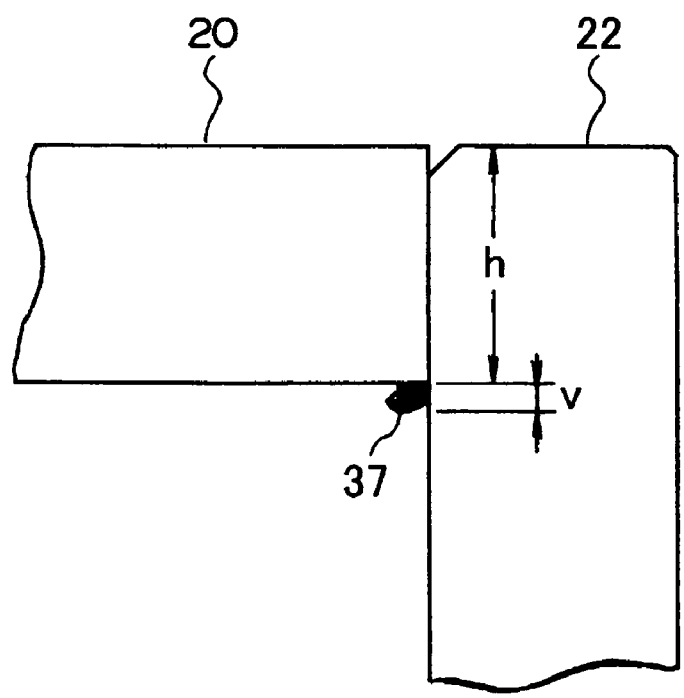

Fig. 9
(a)
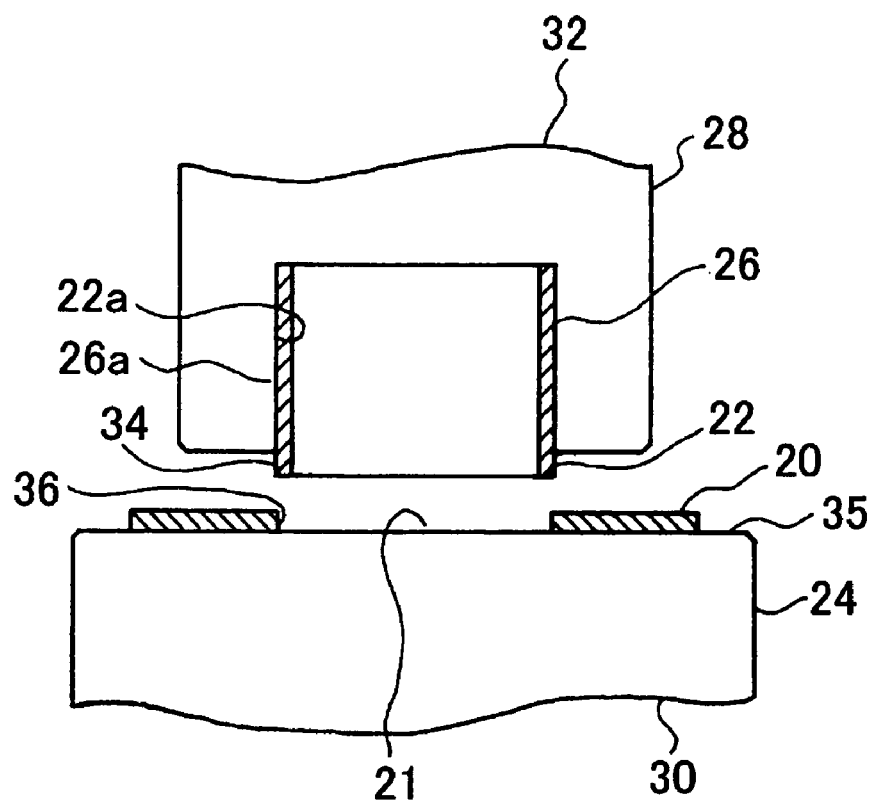
(b)
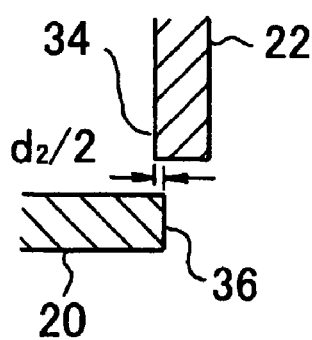
(c)
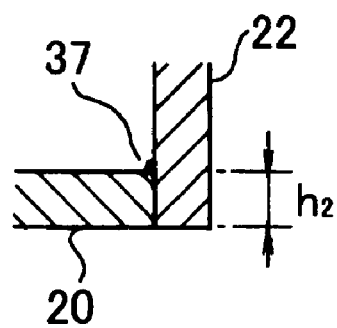

Fig. 12

| *A \ *B | 0.1mm | | | 0.2mm | | | 0.3mm | | | 0.4mm | | |
|---|---|---|---|---|---|---|---|---|---|---|---|---|
| | *1 | *2 | *3 | *1 | *2 | *3 | *1 | *2 | *3 | *1 | *2 | *3 |
| 0.5mm | 7.8 | ○ | ○ | 9.2 | ○ | ○ | 18.0 | ○ | ○ | 17.1 | ○ | ○ |
| 1.0 | 10.3 | ○ | ○ | 16.7 | ○ | ○ | 25.4 | ○ | ○ | 34.1 | ○ | ○ |
| 2.0 | 17.1 | ○ | ○ | 19.5 | △ | ○ | 39.2 | △ | ○ | 38.6 | △ | ○ |
| 3.0 | 21.5 | ○ | ○ | Base metal | △ | ○ | Base metal | △ | ○ | Base metal | △ | ○ |
| 5.0 | 53.4 | △ | ○ | Base metal | △ | × | Base metal | × | × | Base metal | × | × |
| 7.5 | Base metal | △ | × | Base metal | × | × | — | — | — | — | — | — |
| 10.0 | Base metal | △ | × | — | — | — | — | — | — | — | — | — |

*A; Press-fit interference
*B; Press-fit depth
*1; Strength
*2; Flash
*3; Press-fit depth

Fig. 13

| *A \ *B | 0.1mm | | | 0.2mm | | | 0.3mm | | | 0.4mm | | |
|---|---|---|---|---|---|---|---|---|---|---|---|---|
| | *1 | *2 | *3 | *1 | *2 | *3 | *1 | *2 | *3 | *1 | *2 | *3 |
| 1.0mm | 12.8 | ○ | ○ | 15.1 | ○ | ○ | 16.3 | ○ | ○ | 18.3 | ○ | ○ |
| 2.0 | 26.0 | ○ | ○ | 29.4 | △ | ○ | 31.7 | △ | ○ | 32.4 | △ | ○ |
| 3.2 | 36.5 | ○ | ○ | 45.8 | △ | ○ | 50.5 | △ | ○ | 52.6 | △ | ○ |
| 5.0 | 53.6 | △ | ○ | 64.6 | △ | × | 65.9 | × | × | 67.2 | × | × |
| 7.0 | 54.3 | △ | × | 68.3 | × | × | 64.8 | × | × | 70.1 | × | × |

*A; Press-fit interference
*B; Press-fit depth
*1; Strength
*2; Flash
*3; Press-fit depth Fig. 14
(a)
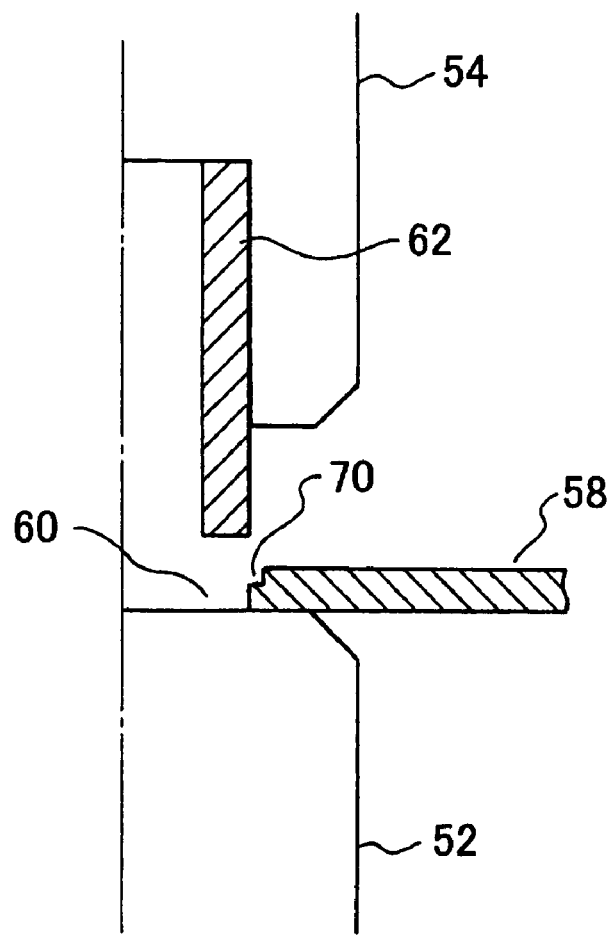
(b)
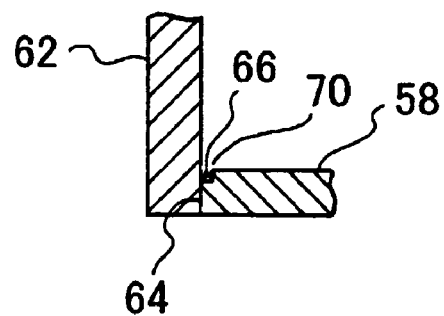

Fig. 15
(a)
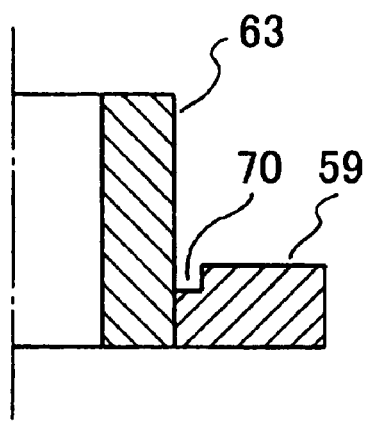
(b)
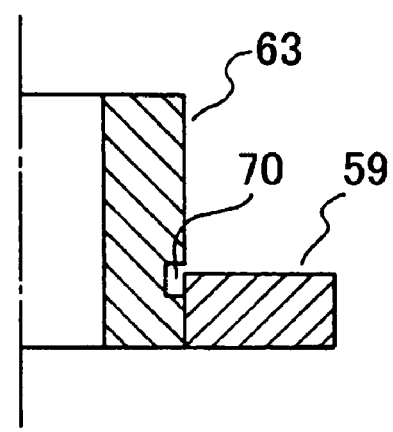
(c)
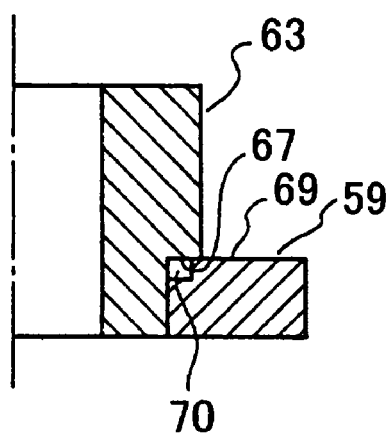
(d)
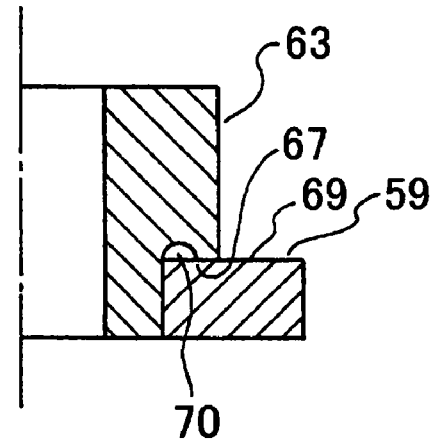

Fig. 16
(a)
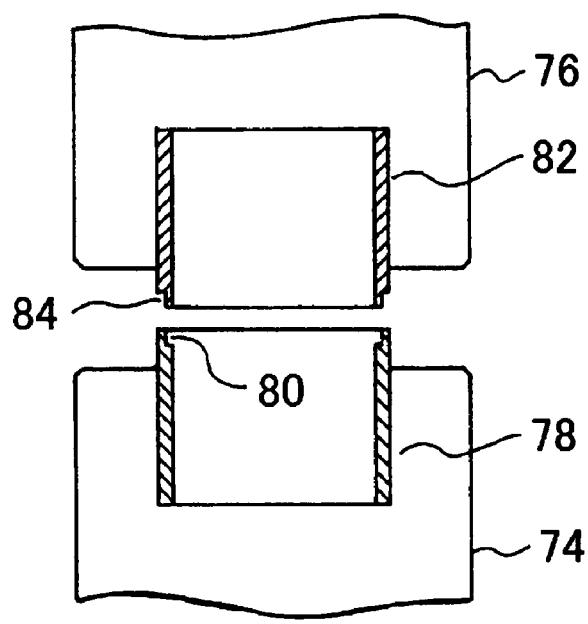
(b)
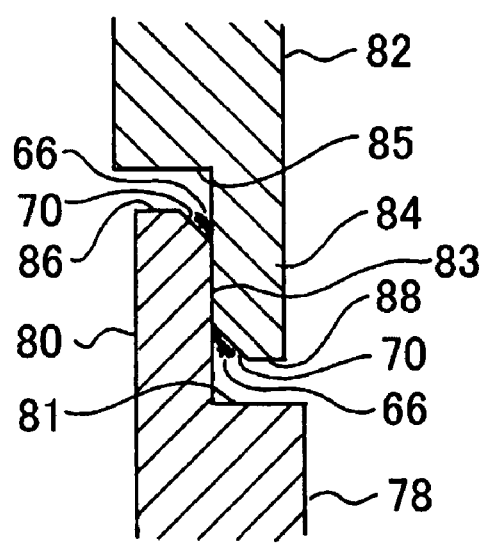

Fig. 18
(a)
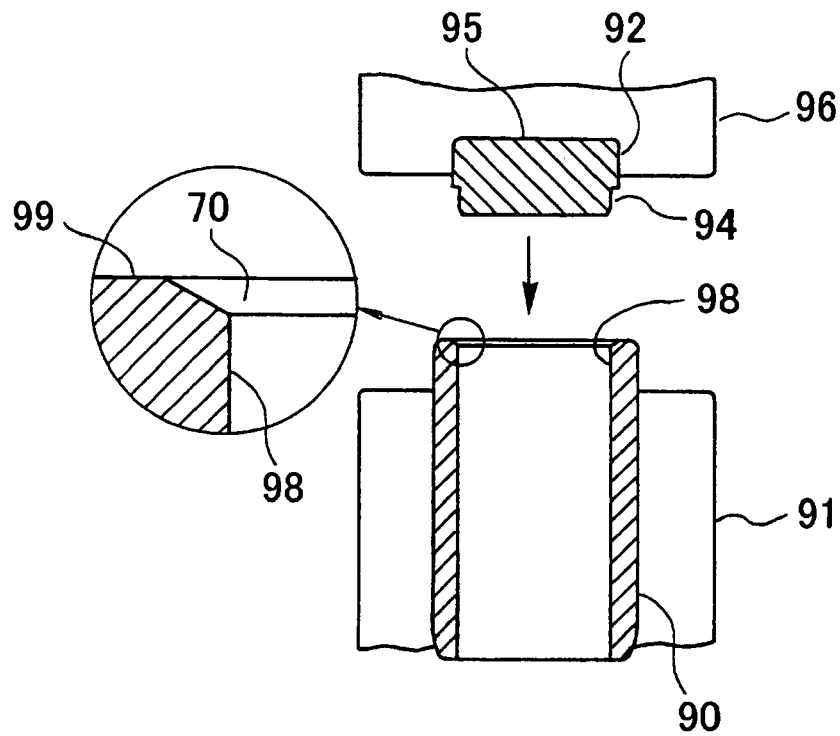
(b)
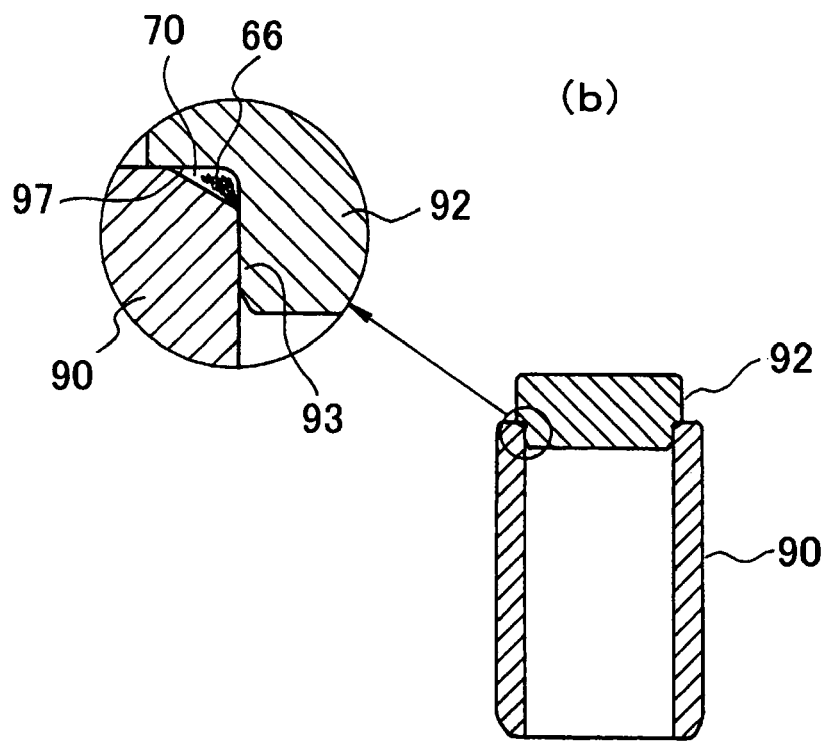

PRESS-FIT JOINT STRUCTURE

FIELD OF THE INVENTION

The present invention relates to a forced-insertion welded structure of members constituting a metal component.

RELATED ART

In manufacturing metal components for use in automotive and others, members to be assembled into the components are generally joined by an arc welding. If a shaft member (or cylindrical member) is to be joined to a plate member, for example, the shaft member is fitted into a hole formed in the plate member and a welding such as arc welding is performed, using a filler metal, entirely or locally along the circumference of the engaged portion of the shaft member. The members are also joined together by a resistance welding, such as spot welding and projection welding, or by caulking.

Another joining method is also available, as described in a cited patent reference 1 (Japanese Patent Disclosure No. 7-40058). In this joining method beads are formed at a base of the pipe to be inserted into a pipe connection hole or lips are formed at an inlet edge of the pipe connection hole and then subjected to a resistance welding.

With the above joining methods, however, heat from the arc welding causes thermal deteriorations and dimensional distortions of base metals such as plate member and shaft member, inevitably degrading precision of welded components. The welded components therefore need to be subjected to post-processing to enhance their precision and remove unnecessary filler metal at the welded portions, requiring a large amount of labor and cost for the finishing work after the welding process.

The above resistance welding includes a lap resistance welding as a mainstream method and establishes a bond between two members by creating a molten metal called a nugget at the joint. To strengthen the weld, the lap resistance welding has no other alternative but to increase the number of nuggets, which inevitably has adverse effects on thermal degradation and dimensional precision of the base metal. Further, the forming of the beads or lips makes the manufacturing process complicated and the welded component requires the post-processing, resulting in an increased cost.

Under these circumstances, the applicant of this invention proposed a localized circumference forced-insertion welded structure, as disclosed in a cited patent reference 2 (Japanese Patent Disclosure No. 2001-353628). The localized circumference forced-insertion welded structure, however, is not suited for the joining of pipes, in which a fluid flows, in terms of air-tightness at the joint. In a full circumference forced-insertion welded structure, since a contact area at time of initial energization is larger than that of the localized circumference forced-insertion welded structure, a greater current is required, limiting the size of the welded structure. To solve this problem, the applicant of this invention conducted tests and developed a new forced-insertion welded structure.

In the new forced-insertion welded structure, the joint interface is scrubbed away and the material thus displaced is accumulated at ends of the joint to form protruding flashes. In this forced-insertion welded structure, the amount of a flash formed at the joint depends on conditions such as press-fit interference and press-fit depth. Particularly when the press-fit interference is 0.3 mm or larger, the amount of flash increases significantly.

The press-fit interference is normally between about 0.1 mm and 0.7 mm. While reducing this interference can minimize the amount of flash, it gives rise to a problem of reduced weld strength. Although the flash can be removed as by turning, this makes the manufacturing process complicated and increases the cost.

The present invention has been accomplished in light of the above problems and it is an object of this invention to provide a forced-insertion welded structure which is easy to manufacture and cost-effective and has a good finish precision and a high strength.

DISCLOSURE OF THE INVENTION

To resolve the above-mentioned technical problems, the forced-insertion welded structure according to this invention, as shown in FIG. 1, comprises: a first member 2, 22 with a hole 13, 21, the hole having an inner wall surface which has the same geometry as a cross section of a forcibly inserted portion of a second member; and the second member 4, 24 having a constant cross section over its length which is similar in shape to the hole 13, 21; wherein a press-fit interference of the second member 4, 24 relative to the hole 13, 21 of the first member 2, 22 is set to 0.1 mm or more; wherein the second member 4, 24 is pushed against the hole 13, 21 of the first member 2, 22 under a predetermined pressure and at the same time an electric current is applied between the two members to generate electric resistance heat in faying portions of the two members to forcibly push the second member 4, 24 into the hole 13, 21, thereby forming a joint interface between the second member 4, 24 and the inner wall surface of the hole 13, 21; wherein the joint thus formed is a solid-state welded joint.

In the forced-insertion welded structure of this invention, after the forced-insertion welding, an electric current is applied again between the first member and the second member to generate electric resistance heat in the faying portions of the two members for their tempering.

In the forced-insertion welded structure of this invention, an upper limit of the press-fit interference is 0.4 mm and the two members are welded together by setting a press-fit depth over which the first and second members are joined together to (1-2×(press-fit interference)) mm or more.

In the forced-insertion welded structure of this invention, an upper limit of the press-fit interference is 0.4 mm and the two members are welded together by setting a press-fit depth over which the first and second members are joined together to 1 mm or more.

In the forced-insertion welded structure of this invention, the first and second members are welded together by setting an upper limit of the press-fit depth over which the two members are joined together to (9-20×(press-fit interference)) mm.

In the forced-insertion welded structure of this invention, the first member is formed into a cylindrical member having a circular hole passing therethrough.

In the forced-insertion welded structure of this invention, the first member and the second member are formed into circular cylindrical members; the first member has its inner circumference in contact with the second member expanded uniformly to form a first faying portion and the second member has its outer circumference contracted uniformly to form a second faying portion; and the second faying portion is joined to an inside of the first faying portion.

In the forced-insertion welded structure of this invention, the first member is formed into a plate member having a circular hole whose inner wall surface extends vertically from a surface of the plate member, and a cross-sectional area of a joint between the first member and the second member is set 20 cm$^2$ or less.

In the forced-insertion welded structure of this invention in which, as shown in FIG. 14, 15, 16 or 18, the second member 62, 63, 82, 92 with a predetermined press-fit interference relative to the hole of the first member 58, 59, 78, 90 is placed against the hole under a predetermined pressure and at the same time an electric current is applied between the two members to generate electric resistance heat in faying portions of the two members to forcibly move the second member into the hole, thereby forming a solid-state joint at a joint interface between the two members; a flash accommodation portion 70 as a space to contain a flash, formed during a forced insertion by scrubbing away that part of the faying portions which corresponds to the press-fit interference, is formed near ends of the joint interface by cutting away or denting a part of the first member or the second member.

In the forced-insertion welded structure of this invention, an edge of the hole of the first member that first contacts the second member as the two members are joined is cut away or dented to form the flash accommodation portion.

In the forced-insertion welded structure of this invention, the faying portion 84 of the second member 82 is formed by uniformly contracting a diameter of an outer circumferential surface thereof over a predetermined range from an end of the second member 82, with a step portion 85 formed between the faying portion and a remaining portion of the second member; the flash accommodation portion 70 is formed by cutting away or denting a part of the second member near the step portion or a part of the first member corresponding to the step portion; and, after welding, the flash accommodation portion 70 is closed by the step portion and the first member to form a closed space. The flash accommodation portion 70 may also be formed by cutting a groove in a circumferential direction in or near the step portion of the second member.

In the forced-insertion welded structure of this invention, the faying portion 80 of the first member 78 is formed by uniformly expanding a diameter of an inner circumferential surface thereof over a predetermined range from an end of the first member 78, with a step portion 81 formed between the faying portion and a remaining portion of the first member; the flash accommodation portion 70 is formed by cutting away or denting a part of the first member near the step portion or a part of the second member corresponding to the step portion; and, after welding, the flash accommodation portion 70 is closed by the step portion and the second member to form a closed space. The flash accommodation portion 70 may also be formed by cutting a groove in a circumferential direction in or near the step portion of the first member.

In the forced-insertion welded structure of this invention, as the first member a plate member 58 is used which has a hole 60 whose inner wall surface extends vertically from a surface of the plate member, and as the second member a shaft member 61 is used which has a plurality of axially extending non-faying portions formed therein around the circumferential direction.

In the forced-insertion welded structure of this invention, as the first member a cylindrical member is used which has a hole whose inner wall surface has the same geometry as a cross section of a forcibly inserted portion of the second member, and as the second member a cylindrical member is used which has a faying portion of a constant cross section over its length, the faying portion having a predetermined press-fit interference relative to the hole.

In the forced-insertion welded structure of this invention, as the first member a cylindrical member 90 is used which has a hole whose inner wall surface has the same geometry as a cross section of a forcibly inserted portion of the second member, and as the second member a plug member 92 is used which has a faying portion of a constant cross section over its length, the faying portion having a predetermined press-fit interference relative to the hole.

BRIEF DESCRIPTION OF THE DRAWINGS

FIG. 1 is an explanatory diagram showing how a forced-insertion welded joint of a work A is made in one embodiment of the present invention, FIG. 1(a) representing members set in a jig, FIG. 1(b) representing a press-fit interference of the members, FIG. 1(c) representing a press-fit depth of the members.

FIG. 6 is partially enlarged views (a) and (b) of the microscopic photograph of FIG. 5.

FIG. 7 shows flashes formed in the embodiment, FIG. 7(a) representing flashes when the members of the work A are forced-insertion welded, FIG. 7(b) representing flashes when members of a work B are joined.

FIG. 9 is an explanatory diagram showing a forced-insertion welding using the work B according to the embodiment, FIG. 9(a) representing members set in a jig, FIG. 9(b) representing a press-fit interference of the members, FIG. 9(c) representing a press-fit depth of the members.

FIG. 12 is a table showing a result of the first test in the embodiment.

FIG. 13 is a table showing a result of the second test in the embodiment.

FIG. 14 is an explanatory diagram showing how a forced-insertion welded joint is made in one embodiment of the present invention, FIG. 14(a) representing members set in a jig, FIG. 14(b) representing the members after having been forced-insertion welded.

FIG. 15 is a diagram showing members of the embodiment, FIG. 15(a) illustrating a flash accommodating portion formed in a hole member, FIG. 15(b) illustrating a groove-like flash accommodating portion formed in a boss member, FIG. 15(c) illustrating a flash accommodating portion formed in a hole member, FIG. 15(d) illustrating a groove-like flash accommodating portion formed in a boss member.

FIG. 16 is an explanatory diagram showing how a forced-insertion welded joint is made in one embodiment of the present invention, FIG. 16(*a*) representing members set in a jig, FIG. 16(*b*) representing the members as they are forced-insertion welded.

FIG. 18 is an explanatory diagram showing how a forced-insertion welded joint is made in one embodiment of the present invention, FIG. 18(*a*) representing members set in a jig, FIG. 18(*b*) representing the members after they are forced-insertion welded.

BEST MODE FOR IMPLEMENTING THE INVENTION

Figure 2:
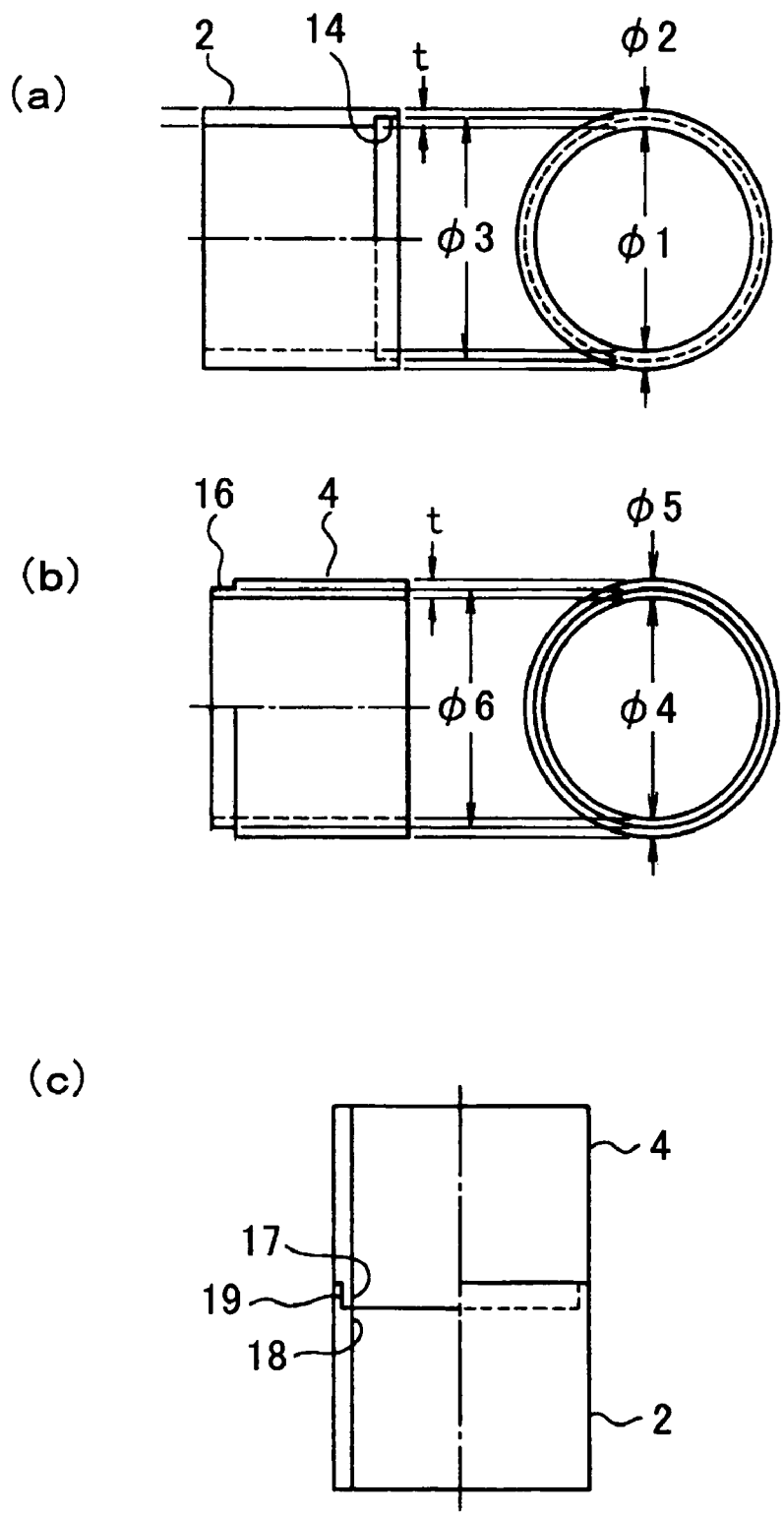
FIG. 2 illustrates the work A, FIG. 2(a) representing a first cylindrical member, FIG. 2(b) representing a second cylindrical member, FIG. 2(c) representing the two members welded together by forced insertion.

Embodiments of this invention will be described by referring to the accompanying drawings.

In the forced-insertion welded structure and the forced-insertion welding method of this embodiment, we take for example a joining of cylindrical members and a joining of a plate member and a cylindrical member to form a metal component or work.

FIG. 1 shows a first cylindrical member 2 being joined to a second cylindrical member 4 to form a work A by using a jig. This jig has a lower die 6 of chrome copper with a cylindrical hole 7 in the upper part thereof and an upper die 8 of chrome copper with a cylindrical hole 9 in the lower part thereof. These upper and lower dies 6, 8 also serve as electrodes 10, 12 respectively and thus electricity can be applied between these dies.

The first cylindrical member 2 is installed in the hole 7 of the lower die 6 with a faying portion 14 in the upper part thereof exposed from the lower die 6. A sidewall surface 2*a* of the first cylindrical member 2 is put in intimate contact with a sidewall portion 7*a* of the hole 7 for application of electricity. The reason that the sidewall surface 2*a* of the first cylindrical member 2 is put in contact with the electrode 10 is to reduce an electric resistance of the first cylindrical member 2 itself for improved current flow. Providing the electrode at the bottom surface of the first cylindrical member 2 will have adverse effects on the current flow. Other methods of providing the electrode to the first cylindrical member 2 may be employed. For instance, the electrode may be installed inside the first cylindrical member 2. What is required is to place the electrode near the faying portion 14 of the first cylindrical member 2. The upper die 8 is attached to a press mechanism not shown and is lowered under pressure.

The first cylindrical member 2, as shown in FIG. 2(*a*), is 19 mm in inner diameter $\phi 1$, 22 mm in outer diameter $\phi 2$ and 1.5 mm in thickness t. The faying portion 14 is formed by cutting away a predetermined area, from the end of the first cylindrical member 2, of the inner circumferential surface to a uniform depth outwardly to form a hole 13 with an expanded inner diameter of $\phi 3$.

The second cylindrical member 4, as shown in FIG. 2(*b*), is 19 mm in inner diameter $\phi 4$, 22 mm in outer diameter $\phi 5$ and 1.5 mm in thickness t. A faying portion 16 is formed by cutting away a predetermined area, from the end of the second cylindrical member 4, of the outer circumferential surface to a uniform depth inwardly (toward the center) to form a circumferential surface with an outer diameter of $\phi 6$.

Then, as shown in FIG. 2(*c*), the faying portion 16 of the second cylindrical member 4 is joined to the faying portion 14 of the first cylindrical member 2.

As shown in FIG. 1(*b*), the outer diameter $\phi 6$ of the second cylindrical member 4 is slightly larger than the inner diameter $\phi 3$ of the first cylindrical member 2, and their difference ($\phi 6 - \phi 3$) constitutes a press-fit interference (d) (a press-fit interference for a radius is expressed as d/2). Because of this press-fit interference (d), the outer circumferential portion of the second cylindrical member 4 engages the inner circumferential portion of the first cylindrical member 2, thus forming an interface portion.

The press-fit interference (d) between the faying portions 14, 16 of these cylindrical members is provided in such a way that the cylinder thicknesses of the faying portions 14, 16 are balanced. Thus, the inner diameter $\phi 3$ of the faying portion 14 is set to 20.5 mm−(press-fit interference (d)/2) and the outer diameter $\phi 6$ of the faying portion 16 is set to 20.5 mm+(press-fit interference (d)/2).

The press-fit depth is normally defined as entire lengths (h) of reduced-thickness portions or of the faying portions 14, 16 of the cylindrical members 2, 4, as shown in FIG. 1(*b*). In the test, however, the press-fit depth (h) is taken as shown in FIG. 1(*c*), with a part of the faying portions 14, 16 left out of the measured depth (h) to allow observation of a flash 15.

An in-house test was conducted, in which the first cylindrical member 2 and the second cylindrical member 4 of the work A were forced-insertion welded along their entire circumference. A result of observation of the welded state will be explained as follows. Chromium molybdenum steel (SCM420) was used as materials for both the first cylindrical member 2 and the second cylindrical member 4. Other materials for the first and second cylindrical members 2, 4 include SUS (stainless steel) and a combination of SUS and carbon steel.

Among other materials in addition to general steel materials are carbon steels for mechanical structures, alloy steels for mechanical structures, heat resistant steels, tool steels, spring steels, cast irons, free-cutting steels, bearing steels and pressure vessel steels and light metals such as titanium, alloy, aluminum and magnesium. The forced-insertion welding may be realized in such material combinations as between low-carbon steels, between low-carbon steel and high-carbon steel, and between high-carbon steels. There are no particular limitations on the material combinations except that the materials used must not include those metals with small electric resistances such as copper and pure aluminum since this forced-insertion welding utilizes an electric resistance of the interfaced portion. Particularly when the combined materials are the same or have almost equal melting points and hardnesses, they are readily joined, forming a uniform structure in the interfaced portion and therefore a good joint.

As one condition for implementing this welding, an applied current was set to 22 kA and an applied pressure was set in a range of between 4 kN and 5 kN. This applied pressure is set lower than a stress of the base metal (in this example, a resistive force that tends to prevent the second cylindrical member 4 from being forced into the first cylindrical member 2). Thus, the forced-insertion welding is initiated from when this applied pressure exceeds the stress of the base metal that is lowered as the base metal is softened.

In the process of welding, as shown in FIG. 1, the first cylindrical member 2 is fitted into the hole 7 of the lower die 6 and the second cylindrical member 4 is fitted into the hole 9 of the upper die 8. Then, the upper die 8 is lowered to push the second cylindrical member 4 under a predetermined pressure against the first cylindrical member 2 and at the same time a current is applied between the first cylindrical member 2 and the second cylindrical member 4. As an electric resistance heat develops, the second cylindrical member 4 starts to be forced-insertion welded, with the faying portion 16 of the second cylindrical member 4 moving down inside the faying portion 14 of the hole 13 of the first cylindrical member 2. At this time the faying portions of both members rub against each other as they are forced-insertion welded together during the manufacturing process.

At this time the forced-insertion welding is performed under a constant applied pressure and at a constant lowering speed. The portion to be joined are instantly heated and the front end portion 17 of the second cylindrical member 4 quickly reaches the step portion 18 of the first cylindrical member 2, completing the welding in a short period of time. During this process a joint interface 19 is formed by a solid-state welding between the faying portion 14 of the first cylindrical member 2 and the faying portion 16 of the second cylindrical member 4. In the solid-state welding the welded state depends on whether the faying surfaces are clean. With the forced-insertion welding of this embodiment, the faying wall surfaces of the second cylindrical member 4 and the first cylindrical member 2 rub against each other as they slide in pressurized contact toward each other. As a result, contamination layers on the wall surfaces are removed by friction, making the faying wall surfaces clean, so that a solid-state welding of the clean surfaces is realized.

Figure 3:
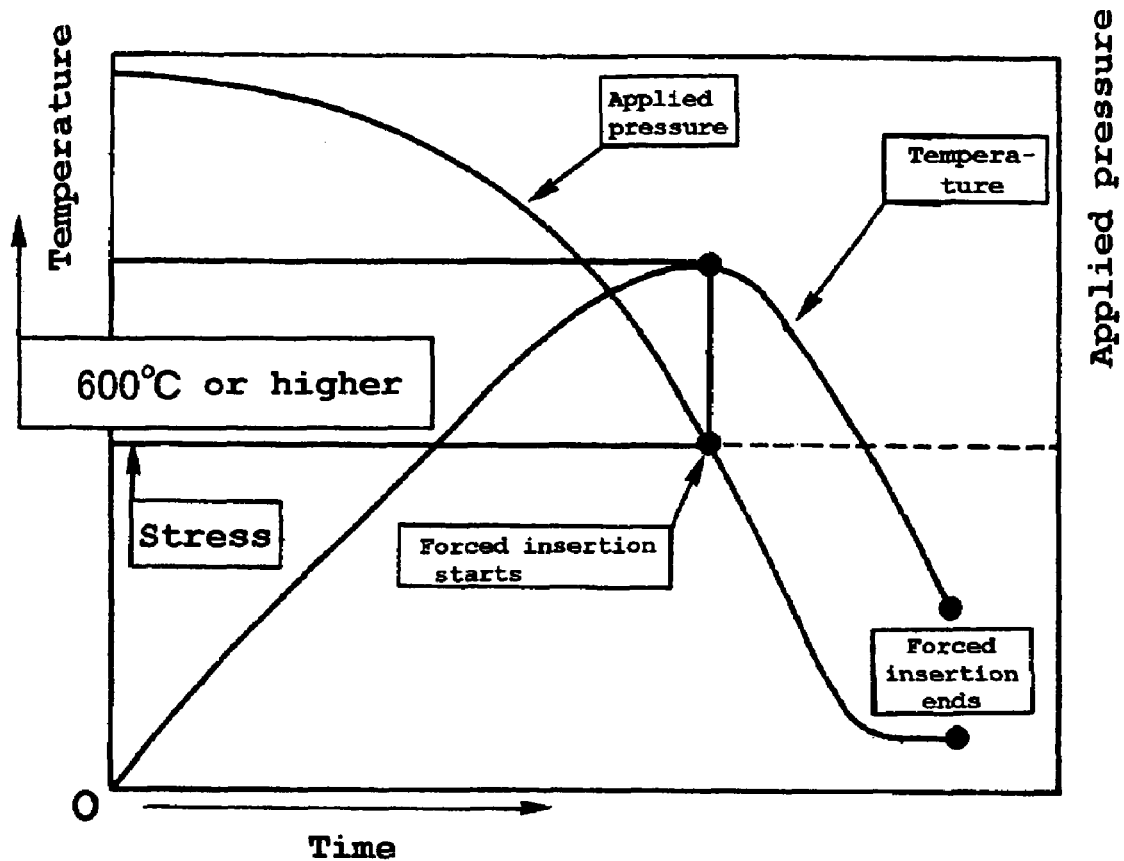
FIG. 3 is a graph showing a joining process of the embodiment in terms of an applied pressure and a change in stress versus a temperature transition.

FIG. 3 shows the above welding process in terms of an applied pressure and a change in deformation resistance of a base metal in the faying portions with respect to a temperature change in the faying portions caused by a resistance heat. The ordinate represents a temperature of the faying portions and a deformation resistance of the base metal in the faying portions. The abscissa represents a time axis of the welding process. The welding process is explained according to the time axis. At a start point the temperature of the faying portions is at room temperature and the hardness of the base metal (the first cylindrical member 2 and the second cylindrical member 4) is that of the material itself, so the base metal maintains enough deformation resistance against the applied pressure. Thus, at this point in time the second cylindrical member 4, though pressurized, remains at the top of the first cylindrical member 2.

With elapse of time, the interface portion is heated by the resistance heat generated by an electric current flowing therethrough and begins to soften up. As the interface portion softens up, its deformation resistance lowers and a point in the diagram at which the deformation resistance becomes lower than the applied pressure constitutes a start point of the forced-insertion welding. At this point the second cylindrical member 4 begins to move down rubbing the first cylindrical member 2. At this start point the temperature of the interface portion is considered to have reached the maximum level.

Then, as the forced-insertion welding proceeds, a contact area of the interface portion increases and a cross-sectional area difference decreases, lowering a current density, which in turn reduces the amount of resistance heat generated and lowers the temperature of the interface portion. When the second cylindrical member 4 has moved inside the first cylindrical member 2 completely, the welding process is finished. The above whole process, from the pressure application, the start of current application and the start of forced-insertion welding to the end of forced-insertion welding, is performed in as short a time as less than one second. After the forced-insertion welding, the bonded base metal is cooled and solidified to regain its original hardness, forming a robust joint.

If tempering is not performed, the welding sequence involves a pressure application followed by a current application, followed by a frictional joining and followed by a natural cooling (rapid cooling). After the forced-insertion welding, the bonded base metal, if left for natural cooling, is rapidly cooled by the copper electrodes. Therefore, if the base metal to be forced-insertion welded has a property of being easily quenched, the joint is hardened and become brittle. This quenching may be explained as follows. Because the above forced-insertion welding applies heat locally and rapidly to the bonded portion, a temperature gradient between the bonded portion and the non-bonded portion is large and the bonded portion which was heated to higher than a transformation point of steel (A3) is rapidly cooled as soon as the heat generation stops and is transformed into a martensite structure. This martensite structure increases proportionally with a carbon equivalent of the material and the size of the material being joined.

Figure 4:
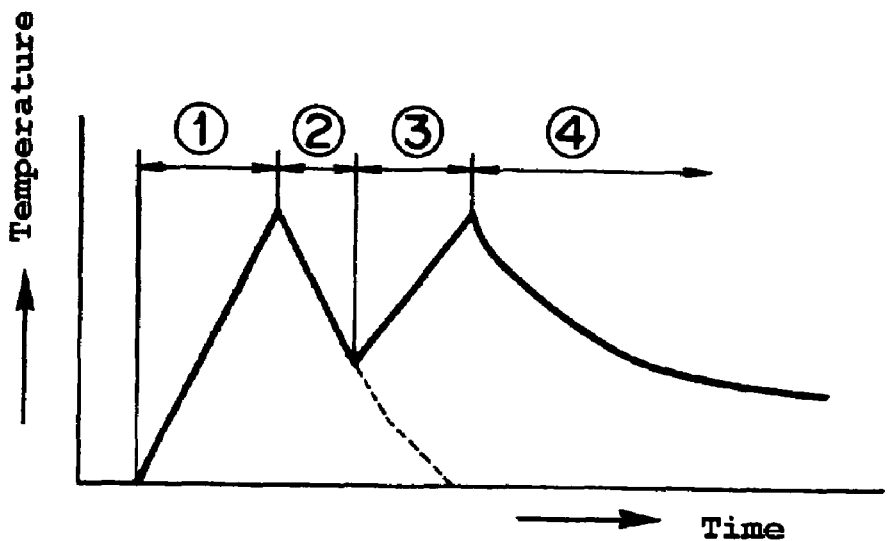
FIG. 4 is a graph showing a relation between time and temperature of the work in the process of heating and tempering by re-energization.

In this embodiment, immediately after the welding by heating and rapid cooling, a temper current is applied between the first cylindrical member 2 and the second cylindrical member 4 for reheating. This reheating process tempers the joint to recover its toughness. FIG. 4 is a graph showing a temperature change when a tempering process is added to the above forced-insertion welding process. As shown in the figure, the whole process consists of four sub-processes: (1) pressure application and current application (forced-insertion), (2) natural cooling (rapid cooling), (3) current application (tempering) and (4) natural cooling (slow cooling).

The tempering has a significant advantage in addition to those described by general theories of hardening and tempering. That is, the temper current application causes highly saturated carbon trapped in martensite formed by the hardening to precipitate out of the martensite as fine-grained carbide. As a result, the martensite as a hardened structure is transformed into a tempered martensite with a recovered toughness. Since these processes are executed in a short period of time, it is desired that the jig in which the members are first set be used throughout the processes. The above tempering is effective particularly where the work uses steels with a carbon content of S30C or higher or materials with a carbon equivalent of 0.3% or higher.

Figure 5:
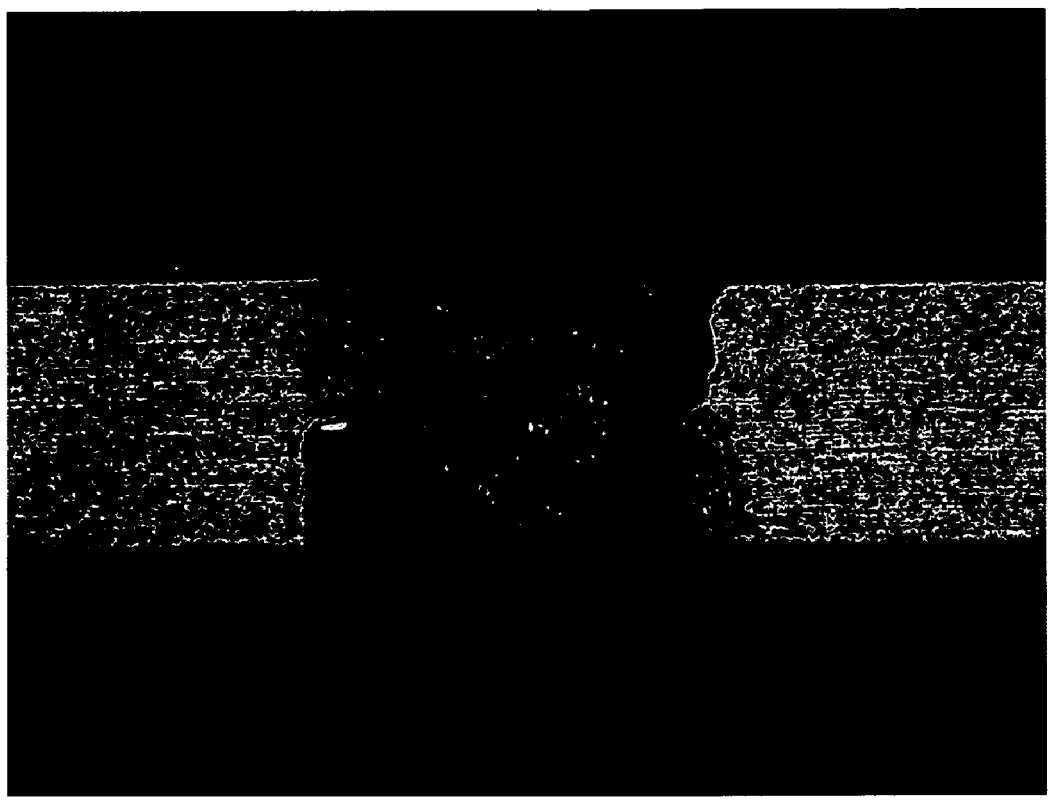
FIG. 5 is a microscopic photograph of a metallic joint interface of the work A in the embodiment.

FIG. 5 and FIG. 6 are microscopic photographs of a joint at the interface when the second cylindrical member 4 is forced-insertion welded to the first cylindrical member 2. The interference (d) at this time is 0.2 mm. Observation of the sample indicates that a region around the joint that is influenced by heat (hardened region) is relatively narrow and, in this region, crystal grains do not grow and an irregular grain structure is observed. At the joint interface the welded state is good with no abnormal carbide or oxide found. This means a desired mechanical strength is secured.

It is concluded from the above observation that, although the surface regions of the faying portions are softened or only limited thin layers of the faying portions are melted by the concentrated current immediately after the forced insertion because the interface portion is narrow immediately after the forced insertion, the joined state can be said to have reached that of a solid-state welding accompanied by a plastic deformation from the forced insertion. Therefore, unlike the conventional lap resistance welding, the forced-insertion welding of this embodiment has almost no melted-and-solidified layers in the joint and thus provides a welded structure of the solid-state welding or close to it.

Of particular importance in the forced-insertion welding is that, during the process of forced insertion, the faying surfaces are in sliding contact with each other and this sliding motion scrubs away contaminated layers on their surfaces. With this action, the faying surfaces are cleared of any contamination, which is essential for the solid-state welding that bonds two members firmly. This effect is characteristic of this welding method.

The first in-house test conducted on the work A is explained here. In this test, the forced-insertion welding was performed with the press-fit interference (d) for the radius of the work A set in a range of 0.1 mm to 0.4 mm and the press-fit depth (h) in a range of 0.5 mm to 10.0 mm. A table of FIG. 12 shows a test result on a separation strength of the joint, the amount of a flash 15 formed at ends of the joint and the press-fit depth.

In this test, the welding was not performed for the interference (d=φ6−φ3) between the first cylindrical member 2 and the second cylindrical member 4 of less than 0.1 mm. The reason for the exclusion of the small interference from the test is that the amount of material scrubbed away is small and therefore the joint formed is expected to be unstable and that, during the resistance welding, since the forced insertion is done at an initially applied pressure, the test is difficult to perform and accurate data cannot be obtained. For the interference (d) of 0.5 mm or greater, the amount of material scrubbed away, which is determined by the press-fit depth and interference, is too large to produce a desirable finish appearance. Hence, this range of interference is also excluded from the test.

Separation strengths shown in the table were obtained by fixing the first cylindrical member 2 of the test sample, applying a compressive load to the end face of the second cylindrical member 4 from a direction opposite the insertion direction, and measuring a load at which the second cylindrical member 4 separates from the first cylindrical member 2 (breakdown load of the joint). A testing machine used to measure the separation strength was a universal tensile tester autograph (Shimadzu Seisakusho Co., Ltd.).

In the table the "separation strength" has a unit of kN and the word "base metal" in the strength column indicates that the base metal itself fractured. The fracture of the base metal occurred in a heat-affected portion which lies at a boundary between the joined portion and the non-joined portion of the base metal. No break was found at the joined portion.

FIG. 7(a) shows a flash 15 (at the front end of the first cylindrical member 2) and a flash 15' (at the front end of the second cylindrical member 4) when the second cylindrical member 4 was forcibly inserted into the first cylindrical member 2. As with the joining of the first cylindrical member 2 and the second cylindrical member 4, if the joined portions are symmetrical (cross-sectional shapes of the joined portions are almost equal), the state of the flash formed varies depending on a deformation resistance at an elevated temperature. FIG. 7(b) shows a flash 37 formed when a cylindrical member 22 was forcibly inserted into a plate member 20, which will be described later.

The amount of flash 15 is visually checked. As shown in FIG. 7, if the amount of flash (v) as visually measured in the same direction as the press-fit depth (h) is within about 20% of the press-fit depth (h), it is decided that the amount of flash is small. If it is more than 20%, the amount of flash is judged as being large. In the test, the faying portions are chamfered at the edges on the contact side and the press-fit depth measured includes the chamfered portion for ease of measurement.

In tables of FIG. 12 and FIG. 13, as to the check result of "flash" column, "○" indicates that there is almost no flash, "Δ" indicates that the amount of flash is small, and "×" indicates that the amount of flash is large. In the "press-fit depth" column, a mark "○" indicates that the forced insertion was done to the associated depth and "×" indicates that the forced insertion to that depth failed.

Figure 8:
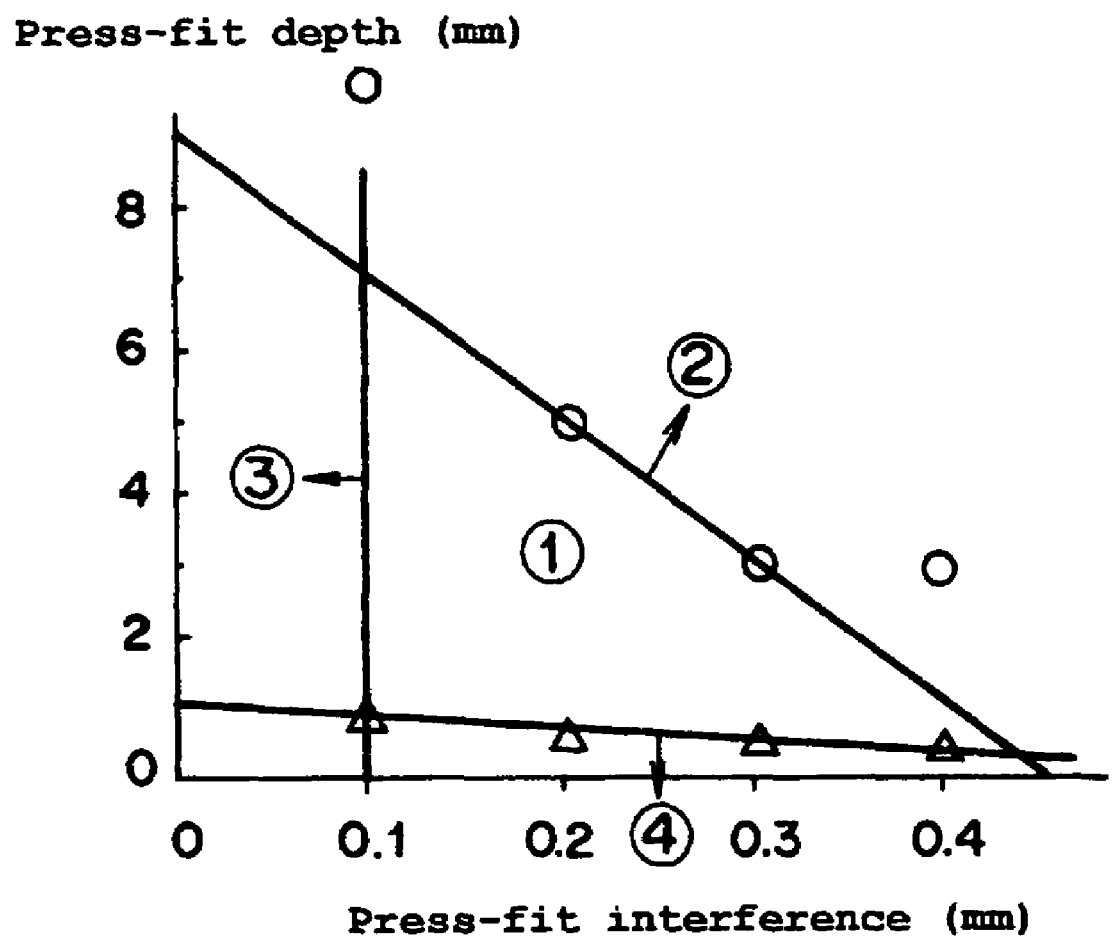
FIG. 8 is a graph showing a desirable relation between a press-fit interference and a press-fit depth in a first test using the work A according to the embodiment.

FIG. 8 is a graph based on the test result, showing a range in which a good welded joint can be obtained. As criteria for good joint, the following considerations are taken: (1) the joint strength is more than 10 kN, (2) the amount of flash formed as a result of forced insertion is small, and (3) permanent deformations of the forcibly inserted member, such as buckling and compression, is small.

The test result shown in the figure indicates that as the press-fit interference or press-fit depth increases the joint strength also increases. The criterion for a satisfactory joint strength may vary according to the use of the product. Since the normal joint strength is several kN, the joint strength of "10 kN or higher" is taken as a criterion.

When the press-fit interference is less than 0.1 mm, the amount of material scrubbed which is determined by the interference is small, making the joined state unstable. So, this interference range was excluded. Therefore the interference range considered is given by an equation (3)

$$0.1 \leq \text{Press-fit interference (mm)} \quad (3)$$

An increased interference results in an increased amount of flash and therefore a degraded appearance of the joint. So, it is desired that the interference be set minimal. However, reduced interference leads to a smaller bonding strength. During the joining process, as long as the faying portions are rubbed against each other as one of the members is forcibly inserted inside the other, the faying surfaces are cleared of oxide films, securing a sufficient level of cleanliness of the joint interface and therefore a sufficient bonding strength. A range of interference that ensures an appropriate rubbing action is defined by the equation (3).

Next, for each press-fit interference a range (lower and upper limits) of press-fit depth that provides a satisfactory strength (10 kN or higher) and a satisfactory quality (flash) will be discussed. For small press-fit depths the quality (flash) is good and does not pose any problem. So, the lower limit of the press-fit depth is restricted by the bonding strength. From the table of FIG. 12, it is seen that the press-fit depth is 1.0 mm for the radial interference of 0.1 mm, 1.0 mm for the interference of 0.2 mm, 0.5 mm for the interference of 0.3 mm, and 0.5 mm for the interference of 0.4 mm. These values are plotted with (Δ).

By connecting the Δ marks for the interferences of 0.1 mm and 0.3 mm with a straight line and taking this line as the lower limit of the press-fit depth, we obtain the following simple relation:

$$1-2\times(\text{press-fit interference}) \leq \text{Press-fit depth (mm)} \quad (4)$$

Therefore, the lower limit of the press-fit depth should preferably be set in the range given by equation (4). If the press-fit depth is smaller than the range of (4), the amount of material scrubbed during the forced insertion is too small to provide an adequate bonding strength.

The press-fit depth that provides a satisfactory strength for the entire range of press-fit interference (0.1-0.4 mm for diameter) is 0.5 mm or more, and more preferably 1.0 mm or more. In this range, the bonding is stable and the sufficient strength can be obtained.

Next, the upper limit of the press-fit depth will be examined. For large press-fit depth the bonding strength obtained is satisfactory (10 kN) and poses no problem. So the upper limit of the press-fit depth is restricted by the quality (flash). If the forced insertion is not accomplished to the indicated depth (×), a sufficient bonding strength can be obtained. Therefore, the press-fit depth is not taken into account in determining the desirable range. Whether the quality is good or not depends on whether the product does not require a finish process. Thus, the quality is considered good in a range up to the small amount of flash (Δ).

Therefore, the upper limit of the press-fit depth that can produce good quality is 10.0 mm for the press-fit interference of 0.1 mm, 5.0 mm for the interference of 0.2 mm, 3.0 mm for the interference of 0.3 mm, and 3.0 mm for the interference of 0.4 mm. These values are plotted with (○).

By connecting the ○ marks for the interferences of 0.2 mm and 0.3 mm with a straight line and taking this line as the upper limit of the press-fit depth, the following simple relation can be derived:

$$\text{Press-fit depth (mm)} \leq 9 - 20 \times (\text{press-fit interference}) \quad (2)$$

Therefore, the upper limit of the press-fit depth should preferably be set in the range given by equation (2).

In this forced-insertion welding, the two members are rubbed against each other at the joint interface and the material scrubbed away is accumulated as flash at the ends of the joint. Because the flash impairs the appearance of the product, it is desired that the amount of flash be made as small as possible without adversely affecting the bonding strength. If the press-fit depth is outside the range of (2), the amount of material scrubbed, which is determined by the press-fit depth and interference, is too large to produce a good finish appearance.

Thus, the desirable range of the press-fit depth for every press-fit interference that ensures a good forced-insertion welding can be defined as a triangular range (1) enclosed by the ranges (2), (3) and (4). As long as the relation between the press-fit interference and the press-fit depth is within the above range (1), any forced-insertion welding can provide a satisfactory bonding strength and a good flash amount.

Further, for the press-fit interference larger than 0.3 mm, particularly at 0.4 mm, the amount of flash becomes notably large, which may not be clearly seen from the table of FIG. 12. It is therefore preferred that the press-fit interference be set smaller than 0.3 mm. If the press-fit depth is 3.0 mm or larger, the bonding strength is almost equal to that of the base metal. From the standpoint of strength, no greater depth is required. Since an increased depth produces an increased amount of flash, the preferred press-fit depth is 3.0 mm or less.

If the second cylindrical member 4 is a solid bar, the forced-insertion welding has no technical difference from the previous one and can be expected to produce the similar effects. Although the joint of the work in this embodiment is circular in cross section for ease of manufacture or for practical purposes, it may have other polygonal shapes, such as oval, triangle and quadrangle, and still the same technique can be applied. If the press-fit interference is set to the similar size, the joint of different shapes formed by this welding can be expected to produce the similar effects.

As for the cross-sectional size of the joint of the work, there is no limit theoretically. Particularly in the case of full circumference welding the electric resistance is small and thus a large current is required. Further, to allow joints to be formed also as by other welding such as arc welding, the cross-sectional area of the joint is preferably set to less than 20 cm² (roughly equivalent to a diameter of less than 50 mm when the joint cross section is circular). When the joint of the work exceeds this size, other problems arise, such as a capacity problem of a current supply facility (maximum capacity of general welding machine is about 45 kA) and effects of resistance of electrodes themselves.

FIG. 9 illustrates a case in which a work B is formed by welding a circular cylindrical member 22 to a circular plate 20 with a circular hole 21 formed therein. In this case, too, the cylindrical member 22 is welded to the plate 20 using a jig. The jig has a lower die 24 of chrome copper and an upper die 28 of chrome copper formed with a circular cylinder-shaped hole 26 in the lower part thereof. These lower die 24 and the upper die 28 also function as electrodes 30, 32.

The cylindrical member 22 is installed in the hole 26 of the upper die 28 with a faying portion 34 in the lower part thereof exposed from the upper die 28. A sidewall surface 22a of the cylindrical member 22 is put in intimate contact with a sidewall surface 26a of the hole 26 for application of electricity. The reason for providing the electrode 32 in this way is already described. The upper die 28 is attached to a press mechanism not shown and is lowered under pressure.

Figure 10:
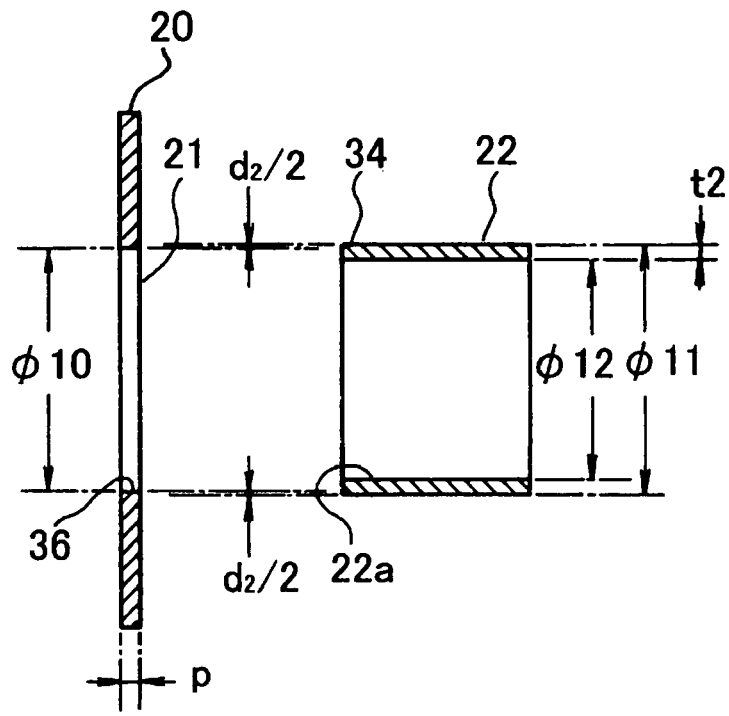
FIG. 10 illustrates a plate member and a cylindrical member of the work B.

As shown in FIG. 10, the plate member 20 has a predetermined thickness (p) and the hole 21 in the plate member 20 is circular in cross section and has a diameter φ10. The plate member 20 has a faying portion 36 in the form of an inner wall of the hole 21 extending vertically from the plate surface.

In the welding process, as shown in FIG. 9, the plate member 20 is placed on a top surface 35 of the lower die 24 and the cylindrical member 22 is fitted in the hole 26 of the upper die 28. Then the upper die 8 is urged downward under a predetermined pressure while at the same time a current is passed between the plate member 20 and the cylindrical member 22 through the electrodes 30, 32. As heat is produced by electric resistance, the cylindrical member 22 begins to be forced into the hole 21, with the faying portion 34 of the cylindrical member 22 moving down inside the faying portion 36 of the hole 21. At this time, because of the interference (d2), the faying portions rub against each other at the joint interface as the forced insertion is effected. The forced insertion is done over the press-fit depth (h2) which is equal to the thickness of the plate member 20, as shown in FIG. 9(c).

As shown in these figures, the outer diameter φ11 of the faying portion 34 of the cylindrical member 22 is slightly larger than the diameter φ10 of the hole 21 of the plate member 20. The press-fit interference (d2) is a difference between these (d2=φ11−φ10) (interference for radius is d2/2). Because of this interference (d2), the outer circumference of the faying portion 34 of the cylindrical member 22 comes into intimate contact with the faying portion 36 of the hole 21 of the plate member 20 to form an interface portion. More specifically, the cylindrical member 22 is circular, (17.0+interference (d2) mm) in outer diameter φ11 and about 1.5 mm in thickness (t2).

Next, the second in-house test will be described. In this test the cylindrical member 22 is forcibly inserted into the hole 21 of the plate member 20 for full circumference welding to form the work B. In this forced-insertion welding, the press-fit interference (d2) was set in a range of between 0.1 mm and 0.4 mm and the press-fit depth (h2) in a range of between 1.0 mm and 7.0 mm. While in the first test, the welding was performed for the depth of 0.5 mm, this welding is excluded from the second test because it is difficult to obtain the depth of 0.5 mm when the thickness of the plate member 20 is set to 0.5 mm. In the second test, a press-fit depth of 3.2 mm is used in place of 3.0 mm for the convenience of material preparation.

A table of FIG. 13 shows a test result on a separation strength of the joint, the amount of flash 37 formed at the ends of the joint, and a press-fit depth. As for the material, the plate member 20 used a cemented material and the cylindrical member 22 used S20C (carbon steel). As in the first test, tempering was done by re-energization.

In this test the welding was not performed for the press-fit interference (d2) of between 0.1 mm and 0.5 mm for the same reason as that of the first test. Other conditions and test specifications are the same as those of the first test.

The table of FIG. 13 shows similar results to those of FIG. 12. What was discussed regarding the bonding strength, the amount of flash and the press-fit depth by referring to FIG. 13 can also apply to the table of FIG. 13. This indicates that if the form of welding and the member differ, the similar effects of the forced-insertion welding can be expected.

Figure 11:
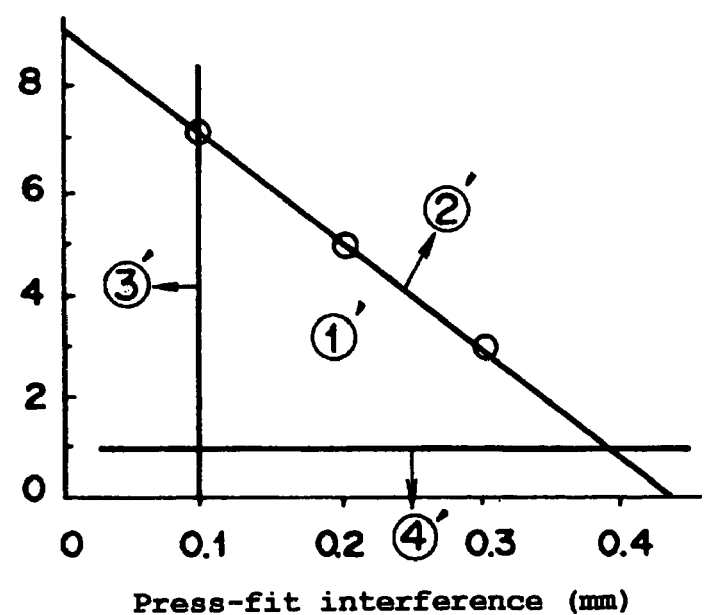
FIG. 11 is a graph showing a desirable relation between a press-fit interference and a press-fit depth in a second test using the work B according to the embodiment.

FIG. 11 is a graph based on the test result which shows a range in which a good weld can be formed. Criteria for a good weld consider, as in the first test, (1) the joint strength is 10 kN or higher, (2) the amount of flash 37 formed by the forced-insertion welding is small, and (3) the forcibly inserted member is not permanently deformed as by buckling and compression.

As for the press-fit interference, when the interference is less than 0.1 mm, the amount of material scrubbed away because of the interference is small and the resultant joint is unstable. Thus the interference of less than 0.1 mm is excluded. The range of press-fit interference is given by equation (3)'.

$$0.1 \leq \text{Press-fit interference (mm)} \qquad (3)'$$

Next, for each press-fit interference a range (lower and upper limits) of press-fit depth that provides a satisfactory strength (10 kN or higher) and a satisfactory quality (flash) will be discussed. For small press-fit depths the quality (flash) is good and does not pose any problem. So, the lower limit of the press-fit depth is restricted by the bonding strength. From the table of FIG. 13, it is seen that, for the press-fit depth of 1.0 mm, there is no problem with the bonding strength for any of the press-fit interferences of 0.1 mm to 0.4 mm.

Thus, the press-fit depth needs only to be 1.0 mm or more and we obtain equation (4)'.

$$1.0 \leq \text{Press-fit depth (mm)} \qquad (4)'$$

If the press-fit depth is less than (4), the amount of material scrubbed away during the forced insertion is small and the bonding strength is also small.

Next, the upper limit of the press-fit depth will be examined. For large press-fit depth the bonding strength obtained is satisfactory (10 kN) and poses no problem. So the upper limit of the press-fit depth is restricted by the quality (flash). If the forced insertion is not accomplished to the indicated depth (x), a sufficient bonding strength can be obtained. Therefore, the press-fit depth is not taken into account in determining the desirable range. Whether the quality is good or not depends on whether the product does not require a finish process. Thus, the quality is considered good in a range up to the small amount of flash (Δ).

Therefore, the upper limit of the press-fit depth that can produce good quality is 7.0 mm or longer for the press-fit interference of 0.1 mm, 5.0 mm for the interference of 0.2 mm, 3.2 mm for the interference of 0.3 mm, and 3.2 mm for the interference of 0.4 mm. These values are plotted with (○).

By connecting the ○ marks for the interferences of 0.2 mm and 0.3 mm with a straight line and taking this line as the upper limit of the press-fit depth, the following simple relation can be derived:

$$\text{Press-fit depth (mm)} \leq 9 - 20 \times (\text{press-fit interference}) \qquad (2)'$$

Therefore, the upper limit of the press-fit depth should preferably be set in the range given by equation (2)'.

Thus, the desirable range of the press-fit depth for every press-fit interference that ensures a good forced-insertion welding can be defined as a triangular range (1)' enclosed by the ranges (2)', (3)' and (4)'.

As long as the relation between the press-fit interference and the press-fit depth is within the above range (1), any forced-insertion welding can provide a satisfactory bonding strength and a good flash amount.

Further, for the press-fit interference larger than 0.3 mm, the amount of flash 37 becomes notably large, which may not be clearly seen from the table of FIG. 13. It is therefore preferred that the press-fit interference be set smaller than 0.3 mm. If the press-fit depth is 3.0 mm or larger, the bonding strength obtained is large enough. From the standpoint of strength, no greater depth is required. Since an increased depth produces an increased amount of flash, the preferred press-fit depth is 3.0 mm or less.

If the cylindrical member 22 is a solid bar, the forced-insertion welding has no technical difference from the previous one and can be expected to produce the similar effects. The hole 21 of the plate member 20 may not be a through-hole and need only have a depth equal to or more than the press-fit depth. Although the joint of the work in this embodiment is circular in cross section, it may have other polygonal shapes, such as oval, triangle and quadrangle, and still the same technique can be applied. If the press-fit interference is set to the similar size, the joint of different shapes formed by this welding can be expected to produce the similar effects.

The forced-insertion welding can be used for the manufacture of automotive components. For example, this welding is suited for manufacturing components made up of a plate member and a cylindrical member welded to it—such as control lever components and shift lever components in transmissions—and engine components.

With the forced-insertion welding of this embodiment, therefore, a full-circumference or near full-circumference welding of members can be achieved swiftly and easily by a simple process involving only a forced insertion and a current application. This welding method is low-cost and economical. Because the joint interface is cleaned during the welding process, the joint is formed in good condition and the resultant bonding strength is high. Further, since the welding is done in a solid-state, the region of the base metal affected by heat is small, securing a highly precise joint with a high finish accuracy, which requires almost no post processing.

Therefore, by improving the precision of single parts or members—the plate member and the cylindrical member—the accuracy of the product can be enhanced without having to modify precision errors of the parts after welding in perpendicularity, concentricity and hole pitch. And the component thus obtained can be used as is as a product. Further, the full-circumference welding can secure an air-tightness of the joined portion and is particularly effective for the joining between pipes and between pipe and flange.

As described above, since the thermal degradation of the base metal is much localized, this forced-insertion welding requires no heat treatment after welding for removing strains and stresses. Further, since the dimension accuracy is little affected by this welding, there is no need for finish processing after welding, resulting in a substantial reduction in a processing cost. As for the bonding strength, the strength obtained is equivalent to that provided by ordinary welding. Unlike the jointing method such as caulking, this welding method allows the joint to be subjected to a heat treatment after welding and also enables high carbon steel to be joined at low cost. Further, since the electrode is provided on the sidewall surface of the cylindrical member near the joint interface, the influence of resistance of the cylindrical member itself can be eliminated, allowing the current application to be executed in good condition and thereby securing an appropriate electric resistance heat.

As described above, in the forced-insertion welded structure of this invention, the press-fit interference of a second member with respect to a hole of a first member is set to 0.1 mm or more and the second member is forcibly pushed into the hole of the first member by applying an electric current to generate electric resistance heat, accomplishing a solid-state joint at the interface. This welding can be done quickly with a simple process at low cost. Since the joint interface is cleaned as the two members are forcibly joined, a good joint is obtained which has a high bonding strength. Further, since the members are welded together in a solid state, the joined portion is not thermally degraded and has a good finish precision.

Further, with the forced-insertion welded structure of this invention, the upper limit of the press-fit interference is set to 0.4 mm and the lower limit of the press-fit depth to (1-2×interference) mm or more than 1.0 mm. In addition to the advantages described above, this arrangement provides further advantages of a stable strength, a good finish precision and no post-processing required.

Further, since the welding is done with the upper limit of press-fit depth set in a range of (9-20×interference) mm, the finish precision is particularly good, rendering the post-processing unnecessary, which in turn makes the welded structure economical.

Further, in the forced-insertion welded structure of this invention, since the first member is formed as a cylindrical member having a circular through-hole therein, the jointing of pipes can be accomplished easily and quickly with a high finish precision and a good bonding strength.

Next, by taking the forced-insertion welded structure of the above embodiment a step further, another forced-insertion welded structure will be explained which has a flash accommodation portion formed in a faying portion. A basic process and action of forced insertion is similar to that of the above forced-insertion welding and thus detailed explanation is omitted here.

FIG. 14 shows a forced-insertion welded structure of this embodiment. This welded structure is formed by forcibly inserting a shaft member 62, circular in cross section, into a circular hole 60 of a plate member 58 with a predetermined interference provided between the two members. At an upper edge of the hole 60, the plate member 58 is formed with a flash accommodation portion 70 as a space to accommodate a flash 66. The flash accommodation portion 70 is formed as a recess by cutting off a welding start portion of the plate member 58. This may be cut off in a tapered shape or formed by press as a sheer drop (rounded corner).

Among the materials that may be used for the plate member 58 and the shaft member 62 to be joined by forced-insertion welding are steel (low carbon steel, high carbon steel and alloy steel) and stainless steel. Other materials except for copper and pure aluminum are also possible for the forced-insertion welding. Different kinds of materials may also be combined for the forced-insertion welding. Possible combinations include those between stainless steel and steel, between titanium and steel, and between nickel alloy and steel.

Examples of the flash accommodation portion 70 are shown in FIG. 15. Let the shaft member 62 be defined as a boss member 63 and the plate member 58 as a hole member 59. In one example (FIG. 15(*a*)), the flash accommodation portion 70 is formed by notching or denting the circumference of the welding start portion of the hole member 59 in a recessed shape (or tapered or rounded shape). In another example (FIG. 15(*b*)), the boss member 63 is grooved along its circumference at a position which, when the jointing process is ended, matches the welding start portion. In either example, after the forced insertion is complete, flash is accumulated in or near the flash accommodation portion 70.

The flash accommodation portion 70 formed in the plate member 58 on the hole 60 side corresponds to the flash accommodation portion 70 of FIG. 15(*a*). Another form of the flash accommodation portion 70, such as shown in FIG. 15(*b*) in which the flash accommodation portion is formed in the shaft member 62), may also be adopted. Particularly when the amount of flash is large, these structures of FIGS. 15(*a*) and 15(*b*) may be combined.

In a welded joint, in which a part of the boss member 63 which is joined to the hole member 59 is reduced in outer diameter to form a stepped portion 67, the flash accommodation portion 70 may be formed in the following configurations. In one configuration (FIG. 15(*c*)) the flash accommodation portion 70 is formed by notching or denting the circumference of the welding start portion of the hole member 59 in a recessed shape (or tapered or rounded shape). In another configuration (FIG. 15(*d*)), an inner circumferential part of the stepped portion 67 of the boss member 63 is grooved at a position which, when the jointing process is ended, matches the welding start portion.

In these configurations since flash is formed near the inner circumferential part of the stepped portion 67, it is readily guided into the flash accommodation portion 70. When the amount of flash is large, the above two configurations of FIG. 15(*c*) and FIG. 15(*d*) may be combined. Particularly in the configurations of FIG. 15(*c*) and FIG. 15(*d*), the stepped portion 67 of the boss member 63 and the surface 69 of the hole member 59, after the jointing operation, form a closed space by closing the flash accommodation portion 70. Thus, after the welding, since flash is accommodated in the flash accommodation portion 70 which cannot be seen from outside, the appearance and the finish precision of the welded joint are very good.

A variety of forms of flash accommodation portion 70 are possible as described above. The only requirement is that a space large enough to accommodate flash be formed (in one or both of the members) by cutting a notch near where the flash is formed when the members are joined. Further, the volume of the flash accommodation portion 70 is preferably equal to or larger than the estimated amount of flash. A smaller space volume will result in the flash overflowing from the accommodation portion.

The forced-insertion welding shown in FIG. 14 is carried out in the following procedure. As in this embodiment described above, as soon as electric resistance heat is generated, the shaft member 62 begins to be forcibly inserted with the two members rubbing against each other at the joint interface 64. That is, the sliding motion of the two members toward each other causes their faying wall surfaces to rub against each other at the joint interface 64, scrubbing away contaminated layers from the faying wall surfaces. As a result, the faying wall surfaces are cleaned, allowing a solid-state welding to be performed in good condition. Then, as shown in FIG. 14(*b*), a flash 66 softened and scrubbed away by the forced insertion is guided into the flash accommodation portion 70 formed in the plate member 58 at the edge of the hole 60. The flash 66 therefore is contained there, prevented from protruding outside the flash accommodation portion 70.

After the forced-insertion welding, the joined product is left as is for rapid cooling by the copper electrodes. If the material used has good hardenability, the joined portion is hardened and become brittle. To cope with this problem, the joined portion is subjected to a martensite transformation for a sufficient period of time, after which a second current application is done for tempering. This process transforms the structure of the joined portion from the hardened martensite into a tempered martensite which recovers its toughness, increasing the bonding strength.

Figure 19:
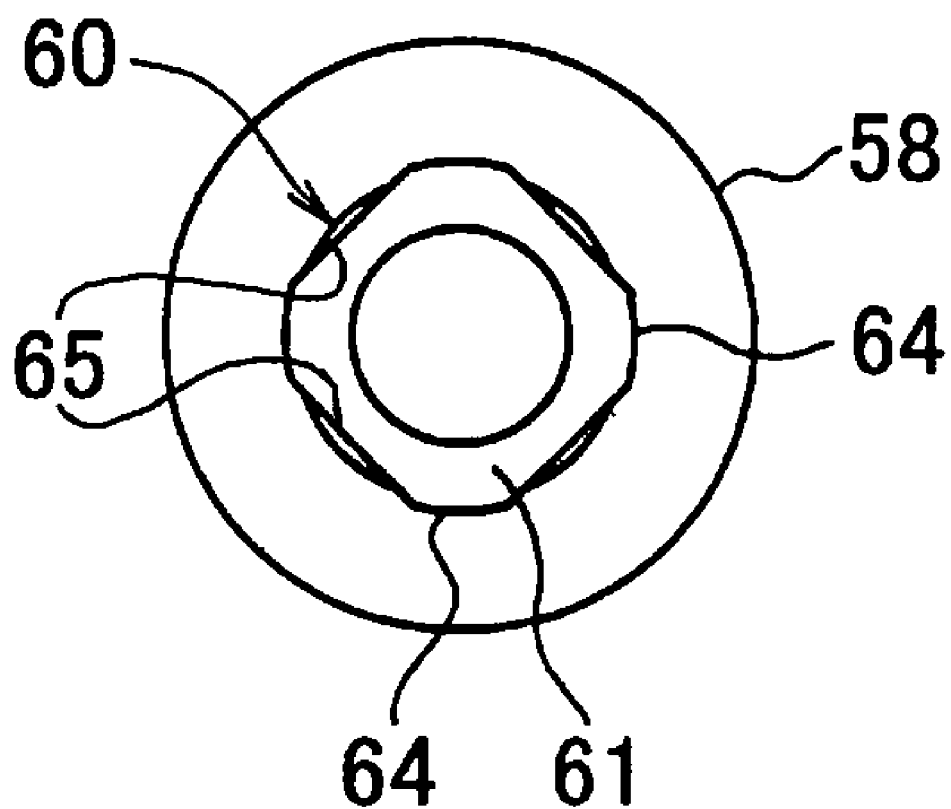
FIG. 19 is a cross section of a joint portion between a hole of the plate member and a shaft member according to the embodiment.

Other forms of the shaft member 62 may be used. For example, as shown in FIG. 19, a shaft member 61 may be formed with recessed portions 65 at a plurality of locations (e.g., four locations) around its circumference. Portions of the shaft member 61 (raised portions 64) that contact the plate member 58 on the hole 60 side have a similar shape to that of the hole 60. Between the raised portions 64 of the shaft member 61 and the hole 60 of the plate member 58 there is a press-fit interference (0.1-0.7 mm for diameter). At these joined portions the flash accommodation portions 20 are formed. The hole 60 of the plate member 58 may not be a through-hole as long as it is deeper than the press-fit depth of the shaft member.

With the forced-insertion welding of this embodiment, the jointing can be done quickly, easily and economically by a simple process involving only a forced insertion and a current application. Further, since the joint interface is cleared of contaminated layers, the welding can be done in good condition, securing a high bonding strength. Moreover, since the welding is performed in a solid state, the region of the thermally affected base metal is small, securing a highly precise joint. Further, a flash produced by the forced-insertion welding is guided into the flash accommodation portion and contained therein, enhancing the finish precision and obviating the post processing, which in turn renders the welding economical.

Therefore, by improving the precision of single parts or members—the plate member and the cylindrical member—the accuracy of the product can be enhanced without having to modify precision errors of the parts after welding in perpendicularity, concentricity and hole pitch. And the component thus obtained can be used as is as a product. As for the bonding strength, the strength obtained is equivalent to that provided by ordinary welding. Unlike the jointing method such as caulking, this welding method allows the joint to be subjected to a heat treatment after welding and also enables steels with high carbon equivalent such as high carbon steel to be joined.

FIG. 16(*a*) shows a joint structure in which the forced-insertion welding is done over an entire circumference. This structure is made by using a jig having a lower die 74 and an upper die 76 as electrodes, both formed of chrome copper, and joining a first cylindrical member 78 as the hole member and a second cylindrical member 82 as the boss member. These cylindrical members 78, 82 may be formed of the same materials as used in the first embodiment described above, such as steel (low and high carbon steel) and stainless steel.

The first cylindrical member 78 has predetermined inner and outer diameters, as shown in FIG. 16(*b*). A faying portion 80 of the first cylindrical member 78 has a predetermined range, measured from its top end, of inner circumferential surface uniformly expanded radially outwardly so that a step portion 81 is formed at a boundary between the radially expanded inner circumferential surface and the inner circumferential surface that is not expanded. The faying portion 80 therefore forms a hole member with this expanded inner circumferential surface. At the top end of the faying portion 80 an inner circumferential edge of the cylindrical member is cut away in a tapered shape (or recessed or rounded shape) to form a flash accommodation portion 70.

The second cylindrical member 82 has predetermined inner and outer diameters, as shown in FIG. 16(*b*). A faying portion 84 of the second cylindrical member 82 has a predetermined range, measured from its bottom end, of outer circumferential surface uniformly contracted radially inwardly (toward the center) so that a step portion 85 is formed at a boundary between the radially contracted outer circumferential surface and the outer circumferential surface that is not contracted. The faying portion 84 therefore forms a boss member with this contracted outer circumferential surface. The outer diameter of the faying portion 84 of the second cylindrical member 82 is slightly larger than the inner diameter of the faying portion 80 of the first cylindrical member 78 to provide a press-fit interference. This interference (for diameter) is set in a range of between 0.1 mm and 0.4 mm and a press-fit depth in a range equal to or larger than 0.4 mm. This arrangement produces a good bonding strength.

At the bottom end of the faying portion 84 an outer circumferential edge of the cylindrical member is cut away in a tapered shape (or recessed or rounded shape) to form a flash accommodation portion 70. The flash accommodation portions 70 formed in the first cylindrical member 78 and the second cylindrical member 82 correspond to the flash accommodation portion 70 of FIG. 15(*c*). The flash accommodation portion 70 of FIG. 15(*d*) can also be adopted in its place. In that case, an inner circumferential part of each of the step portions 81, 85 is grooved to form the flash accommodation portions 70.

While, in this example, the faying portion of the first cylindrical member 78 is expanded in inner diameter and at the same time the faying portion of the second cylindrical member 82 is contracted in outer diameter, it is possible to adopt either an arrangement which has only the inner diameter of the first cylindrical member expanded (without the outer diameter of the second cylindrical member being contracted) or an arrangement which has only the outer diameter of the second cylindrical member contracted (without the inner diameter of the first cylindrical member being expanded). (In either arrangement the press-fit interference is secured.) In this case, the flash accommodation portion is formed in the step portion of the cylindrical member whose diameter is expanded or contracted. Since, after jointing, the flash accommodation portions 70 are closed by the step portions 81, 85 and the end faces 86, 88 of the faying portions 80, 84 to form closed spaces, the flash accommodation portions 70 cannot be seen from outside.

In the first embodiment one of the members (plate member) is placed on the lower die, so a protruding flash is prevented by the lower die from being formed on the side of this member contacting the lower die. Thus the flash is not seen from outside. In the second embodiment, however, the flash forming conditions for the first cylindrical member 78 and the second cylindrical member 82 are the same and flashes 66 are formed at both ends of the joint. Thus, the flash accommodation portion 70 is formed in each of the faying portions 80, 84.

In joining the two members, as in the first embodiment, the first cylindrical member 78 is installed in the lower die 74 of the jig and the second cylindrical member 82 in the upper die 76. The upper die 76 is pushed down with a predetermined pressure and at the same time an electric current is applied between the two cylindrical members 78 and 82. As electric resistance heat is generated, the forced-insertion welding is initiated, scrubbing away contaminated layers from a joint interface 83 by the rubbing action of the two faying portions to effect a solid-state welding.

The flashes 66 softened and scrubbed away by the forced-insertion welding are guided into the flash accommodation portions 70 of the faying portions 80, 84 respectively and contained there. At this time, the flash accommodation portions 70 are closed by the step portions 81, 85 and the end faces 86, 88 of the faying portions 80, 84 to form closed spaces. After the welding is complete, the jointed portion is hardened and becomes brittle, so it is subjected to tempering heat by applying a temper electricity to the joint.

Figure 17:
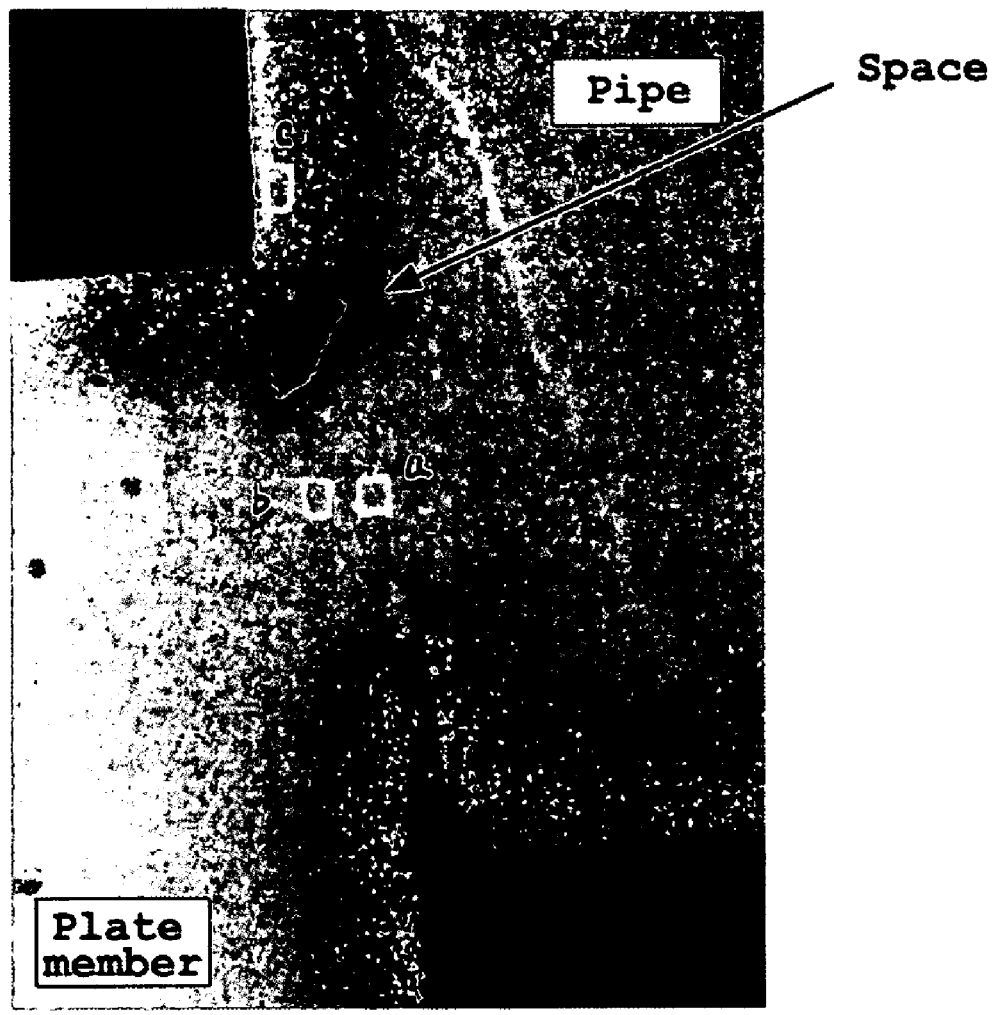
FIG. 17 is a microscopic photograph showing a cross section of members after they are welded together in the embodiment.

FIG. 17 is a photograph showing a cross section of a joint formed by joining a steel pipe, whose faying portion is slightly reduced in diameter, to the hole of a steel plate. It is shown that the surfaces of the steel plate and the pipe are flat, not deformed and in good finished condition, with the flash contained in the flash accommodation portion, which is formed as a closed space. The closed space is left with a space not filled with flash but this poses no problem.

In this embodiment, too, the similar advantages to those of the previous embodiment are obtained. If the welding is done over the entire circumference, an air-tightness can be secured for the joined portion. Thus, the full circumference welding is particularly effective for pipe-to-pipe joining. Further, since the step portion is provided to close the flash accommodation portion, the flash cannot be seen from outside, making the finish appearance look good. Furthermore, since the jointing precision and finished precision are good, no post-processing is required.

Further, in another form of full circumference welded structure, a plate member is formed with a hole, to which a cylindrical member is welded. In this configuration also, the flash accommodation portion as shown in FIG. 15(a) or FIG. 15(b) is formed for the forced-insertion welding. This structure also produces the similar effects to those of the above construction.

FIG. 18 shows still another embodiment of a forced-insertion welded structure. An end portion of a cylindrical member 90 is closed with a plug member 92 by the forced-insertion welding. In this case, too, a jig of chrome copper is used which consists of a lower die 91 and an upper die 96 as electrodes. The cylindrical member 90 and the plug member 92 may use such materials as used in the preceding embodiments, including steel (low and high carbon steel) and stainless steel.

The cylindrical member 90 has predetermined inner and outer diameters, as shown in FIG. 18(a). A faying portion 98 of the cylindrical member 90 has a hole whose inner diameter is defined by an inner circumferential surface of the cylindrical member. Further, at an upper end portion 99 of the faying portion 98 an inner circumferential edge is cut away in a tapered shape (recessed shape) to form a flash accommodation portion 70. The flash accommodation portion 70 formed in the cylindrical member 90 corresponds to the flash accommodation portion 70 of FIG. 15(c). It is also possible to adopt another form of the flash accommodation portion 70 (formed in the plug member 92), such as shown in FIG. 15(d).

The plug member 92, as shown in FIG. 18, has a cylindrical faying portion 94 and an end plate portion 95, the former having a circumferential surface of a predetermined outer diameter. The faying portion 94 is made smaller in outer diameter than the end plate portion 95 and, at their boundary, a step portion 97 is formed. The outer diameter of the faying portion 94 of the plug member 92 is set slightly larger than the inner diameter of the faying portion 98 of the cylindrical member 90 (by about 0.2 mm for diameter) to provide a press-fit interference.

In joining the two members, as in the preceding embodiments, the cylindrical member 90 and the plug member 92 are installed in the jig. The upper die 96 is pushed down with a predetermined pressure and at the same time an electric current is applied between the two members 90 and 92. As electric resistance heat is generated, the forced-insertion welding is initiated, scrubbing away contaminated layers from a joint interface 93 by the rubbing action of the two faying portions. A solid-state welding is therefore performed between the clean surfaces.

The flashes 66 softened and scrubbed away by the forced-insertion welding are guided into the flash accommodation portion 70 of the faying portion and contained there. At this time, the flash accommodation portion 70 is closed by the step portion 97 and the upper end portion 99 of the faying portion 98 to form a closed space. After the welding is complete, the jointed portion is hardened and becomes brittle, so it is subjected to tempering heat by applying a temper electricity to the joint.

This embodiment also can produce the similar effects to those of the preceding embodiments. In addition, the displaced flash is contained in the flash accommodation portion 70, which is closed and blocked from external view by the step portion. So, after welding, the plug member 92 is held in intimate contact with the cylindrical member 90, offering a good finish appearance.

The forced-insertion welded structures of the above embodiments can be used in manufacturing automotive components.

For example, these welded structures are suited for manufacturing components made up of a plate member and a cylindrical member welded to it—such as control lever components and shift lever components in transmissions—and engine components. They can also be used for piping and pump components in hydraulic systems.

As described above, in the forced-insertion welded structure of this invention, the flash accommodation portion, which functions as a space to accommodate a flash formed by displacing the material corresponding in amount to the press-fit interference during the forced-insertion welding, is formed near the end of the joint interface as by cutting away a part of the first or second member. This arrangement enables the welding to be accomplished quickly in a simple process at a low cost. Other advantages offered by this welding method include a strong bonding strength realized by good jointing of clean faying surfaces, a good finish precision realized by the containment of a flash formed by the forced insertion in the flash accommodation portion, and an enhanced economy achieved by the good finish precision obviating post processing.

Further, in the forced-insertion welded structure of this invention, a step portion is provided on the outer circumferential surface of the second member or on the inner circumferential surface of the first member and a flash accommodation portion is formed near the step portion so that it can be closed by the step portion after welding. With this arrangement since flashes are contained in the flash accommodation portion and thus blocked from external view, the appearance and finish precision are enhanced. In addition, the step portion improves the jointing precision and the finish precision, obviating the need for post-processing.

Further, since the forced-insertion welded structure of this invention uses a cylindrical member as the first member and a cylindrical member as the second member, with a predetermined interference provided between the two members, the cylindrical members can be welded together with good air-tightness and precision, which in turn obviates post-processing and therefore renders the welding process economical.

Further, since the forced-insertion welded structure of this invention uses a cylindrical member as the first member and a plug member as the second member, with a predetermined interference provided between the two members, the cylindrical member and the plug member can be welded together with good air-tightness and precision, resulting in a well-sealed end portion of the cylindrical member.

The invention claimed is:

1. A full-circumference forced-insertion welded structure for the manufacture of automotive components comprising:
   a first member with a circular hole, the hole having an inner wall surface whose geometry is the same as a cross section of a forcibly inserted portion of a second member, and the first member is formed into a plate member having the circular hole whose inner wall surface extends vertically from a surface of the plate member; and
   the second member having a constant cross section over its insertion portion which is similar in shape to the hole;
   wherein the first member and the second member consist of steel materials and have almost equal melting points;
   wherein a press-fit interference of the second member relative to the hole of the first member is set to 0.1 mm or more, and is set smaller than 0.3 mm;
   wherein the first and the second members are welded together by setting a press-fit depth over which the two members are jointed together to (1-2×(press-fit interference)) mm or more, and are jointed together by setting an upper limit to (9-20×(press-fit interference)) mm;
   wherein a cross-sectional area of a joint between the first member and the second member is set 20 $cm^2$ or less;
   wherein the second member is pushed against the hole of the first member under a predetermined pressure and at the same time an electric current is applied between the two members to generate electric resistance heat in faying portions of the two members to forcibly push the second member into the hole, with the faying wall surfaces of the second member and the first member rubbing against each other as they slide in pressurized contact toward each other, thereby forming a joint interface between the second member and the inner wall surface of the hole;
   wherein the joint interface thus formed is a solid-state welded joint interface.

2. A forced-insertion welded structure according to claim 1, wherein, after the forced-insertion welding, an electric current is applied again between the first member and the second member to generate electric resistance heat in the faying portions of the two members for their tempering.

3. A forced-insertion welded structure according to claim 1 or 2, wherein a flash accommodation portion as a space to contain a flash, formed during a forced insertion by scrubbing away that part of the faying portions which corresponds to the press-fit interference, is formed near ends of the joint interface by cutting away or denting a part of the first member or the second member.

4. A forced-insertion welded structure according to claim 3, wherein an edge of the hole of the first member that first contacts the second member as the two members are joined is cut away or dented to form the flash accommodation portion.

* * * * *